US009156293B2

(12) United States Patent
Gerber et al.

(10) Patent No.: US 9,156,293 B2
(45) Date of Patent: Oct. 13, 2015

(54) MANUFACTURING TRAY WITH CUSTOMIZED INLAYS FOR PROCESSING DIFFERENT TYPES OF ARTICLES OF MANUFACTURE

(75) Inventors: Marcel Gerber, Zurich (CH); Thomas Bosgiraud, Winterthur (CH)

(73) Assignee: Cimpress Schweiz GmbH, Winterthur (CH)

( * ) Notice: Subject to any disclaimer, the term of this patent is extended or adjusted under 35 U.S.C. 154(b) by 397 days.

(21) Appl. No.: 13/526,500

(22) Filed: Jun. 18, 2012

(65) Prior Publication Data

US 2013/0334757 A1 Dec. 19, 2013

(51) Int. Cl.

*B23Q 3/00* (2006.01)
*B41J 13/14* (2006.01)
*B41J 3/407* (2006.01)

(52) U.S. Cl.

CPC . *B41J 13/14* (2013.01); *B41J 3/407* (2013.01)

(58) Field of Classification Search

USPC .............................. 269/289 R, 292, 293, 309
See application file for complete search history.

(56) References Cited

U.S. PATENT DOCUMENTS 3,584,750 A 6/1971 Temple
3,587,856 A 6/1971 Lemelson
5,080,232 A * 1/1992 Leoncavallo et al. ......... 206/446
5,271,490 A 12/1993 Sticht
5,784,171 A 7/1998 Kano
5,810,487 A 9/1998 Kano et al.
5,873,449 A 2/1999 Davenport
6,059,391 A 5/2000 Fulkerson et al.
6,711,798 B2 3/2004 Sanders et al.
7,059,464 B2 6/2006 Cho et al.
7,234,590 B1 6/2007 Le Borgne
2005/0110816 A1 5/2005 Silverbrook
2007/0201969 A1 8/2007 Dye et al.
2009/0110829 A1 4/2009 Johnson et al.
2010/0182368 A1 7/2010 Matsui et al.
2012/0006718 A1 1/2012 Waldrop et al.
2012/0114457 A1 * 5/2012 Nicoletti ....................... 414/806
2013/0209207 A1 8/2013 Longobardi
2013/0294879 A1 11/2013 Middleberg et al.
2013/0306434 A1 11/2013 Issing (Continued)

FOREIGN PATENT DOCUMENTS

WO 2010/068276 6/2010
WO 2011/162071 12/2011

(Continued)

OTHER PUBLICATIONS

European Patent Office, "European Search Report," completed on Mar. 13, 2014 for EP Application No. 1319188.0.

(Continued)

*Primary Examiner* — Lee D Wilson
*Assistant Examiner* — Shantese McDonald
(74) *Attorney, Agent, or Firm* — Jessica Costa

(57) ABSTRACT

A manufacturing tray for imprinting custom content onto different articles of manufacture includes a tray base and frame, and a plurality of interchangeable different customized inlays for holding different types of articles of manufacture. Each tray includes an identifier which may be associated with a custom processing job for instructing the imprinting system which of a plurality of available pre-treatment, post-treatment, and imprinting processes to perform.

9 Claims, 25 Drawing Sheets

(56) References Cited

U.S. PATENT DOCUMENTS

| | | | | |
|---|---|---|---|---|
| 2013/0333579 | A1 | 12/2013 | Gerber et al. | |
| 2013/0334010 | A1 | 12/2013 | Gerber et al. | |
| 2013/0335464 | A1 | 12/2013 | Gerber | |
| 2013/0335467 | A1 | 12/2013 | Gerber | |
| 2014/0212248 | A1 * | 7/2014 | Takai et al. | 414/273 |

FOREIGN PATENT DOCUMENTS

| | | |
|---|---|---|
| WO | 2012/014899 | 2/2012 |
| WO | 2013/150702 | 10/2013 |

OTHER PUBLICATIONS

U.S. Patent and Trademark Office, Non-Final Office Action dated Jan. 9, 2014, for U.S. Appl. No. 13/526,517.

U.S. Patent Office, Non-Final Office Action dated Jan. 17, 2014, for U.S. Appl. No. 13/526,229.

U.S. Patent Office, Non-Final Office Action dated Oct. 22, 2013, for U.S. Appl. No. 13/526,264.

United States Patent and Trademark Office, "Final Office Action," issued on Jul. 17, 2014 for U.S. Appl. No. 13/526,264.

U.S. Patent and Trademark Office, Non-Final Office Action dated Oct. 4, 2013, for U.S. Appl. No. 13/526,508.

United States Patent and Trademark Office, "Non-Final Office Action," issued on Mar. 13, 2014 for U.S. Appl. No. 13/526,508.

United States Patent and Trademark Office, "Non-Final Office Action," issued on Nov. 10, 2014 for U.S. Appl. No. 13/526,229.

United States Patent and Trademark Office, "Final Office Action," issued on Nov. 20, 2014 for U.S. Appl. No. 13/526,508.

* cited by examiner

MANUFACTURING TRAY WITH CUSTOMIZED INLAYS FOR PROCESSING DIFFERENT TYPES OF ARTICLES OF MANUFACTURE

BACKGROUND OF THE INVENTION

The present invention relates generally to printing on articles of manufacture, and more particularly to a manufacturing tray with customized inlays for processing different types of articles of manufacture.

Performance improvements in computing, networking and communications has led to enormous advances in the number and types of capabilities that one can achieve using a networked device. For example, in the printing industry, websites such as www.vistaprint.com allow a user of a networked device to select and customize template designs for printed and electronic products, and then to order and purchase quantities of such product(s). As the ability to customize designs for printed products becomes simpler for the end customer, the demand for customized printed designs on different types of products has increased. For example, consumers desire not only printed paper documents such as business cards, postcards, brochures, posters, etc., but also many other types of items such as shirts, hats and other garments, and office tools and promotional items such as rulers, USB drives, calculators, toys, tape measures, etc.

As the desire for articles of manufacture such as the promotional items and office tools just described increases, companies looking to print on such products seek ways to meet the demand. Typically, printing on an article of manufacture, especially those that do not comprise a paper product, requires a specialized printing platform (hereinafter "printer tray") designed to fixedly retain the article of manufacture while a particular design is printed thereon. A blank (unprinted) article of manufacture is loaded onto the specialized printer tray, which in turn is loaded onto a conveyance system of the printing system, which prints the intended design on the article of manufacture. In an industrial environment, manufacturers of printed articles of manufacture typically imprint the same design on a long run of the same type of article of manufacture. This is due in part to the fact that mass production has traditionally been the realm of non-customized unpersonalized products, and further in part due to the high setup time for each print run. In general, in the past, higher efficiencies in terms of time and cost were achieved by printing the same design on high quantities of the same type of article of manufacture. The fewer the quantity of a given type of article of manufacture printed with a given design, the less efficient the process was.

Mass customization overturns the traditional model for achieving high efficiencies in printing. For any given type of article of manufacture, there may be as many different unique designs to print as there are quantity of the particular type of article of manufacture. Adding into this mix any number of different types of articles of manufacture, and the traditional model for achieving printing efficiencies is no longer applicable.

What is needed is a new printing model which allows any number of unique print designs to be printed on any number of different types of articles of manufacture without interrupting the manufacturing (i.e., "printing") flow or causing downtime of the printing system. Furthermore, it would be desirable to allow multiple different types of articles of manufacture to be printed in any order in the manufacturing flow. Additionally, it would be desirable to allow insertion of high-priority print jobs into the manufacturing flow without interrupting the flow or causing any downtime of the printing system.

SUMMARY OF THE INVENTION

An embodiment includes a manufacturing tray for imprinting custom content onto different articles of manufacture includes a tray base and frame, and a plurality of interchangeable different customized inlays for holding different types of articles of manufacture. Each tray includes an identifier which may be associated with a custom processing job for instructing the imprinting system which of a plurality of available pre-treatment, post-treatment, and imprinting processes to perform.

BRIEF DESCRIPTION OF THE DRAWINGS

A more complete appreciation of this invention, and many of the attendant advantages thereof, will be readily apparent as the same becomes better understood by reference to the following detailed description when considered in conjunction with the accompanying drawings in which like reference symbols indicate the same or similar components, wherein:

FIG. 4B1 is a zoomed-in view of a section of the tray rack shown in FIG. 4B;

DETAILED DESCRIPTION

Embodiments of the invention are directed to supporting a new printing paradigm through methods and systems which alone or together allow any number of unique print designs to be printed on any number of different types of articles of manufacture without interrupting the print manufacturing flow or causing downtime of the printing system(s). Embodiments of the invention may further be configured to allow multiple different types of articles of manufacture to be interspersed in a print manufacturing flow in any order and without regard to which type(s) of articles of manufacture are precedingly or succeedingly printed in the flow. Embodiments of the invention may further be configured to allow insertion of high-priority print jobs into the queue of a currently running print manufacturing flow without interrupting the flow or requiring any downtime of the printing system(s).

Figure 1A:
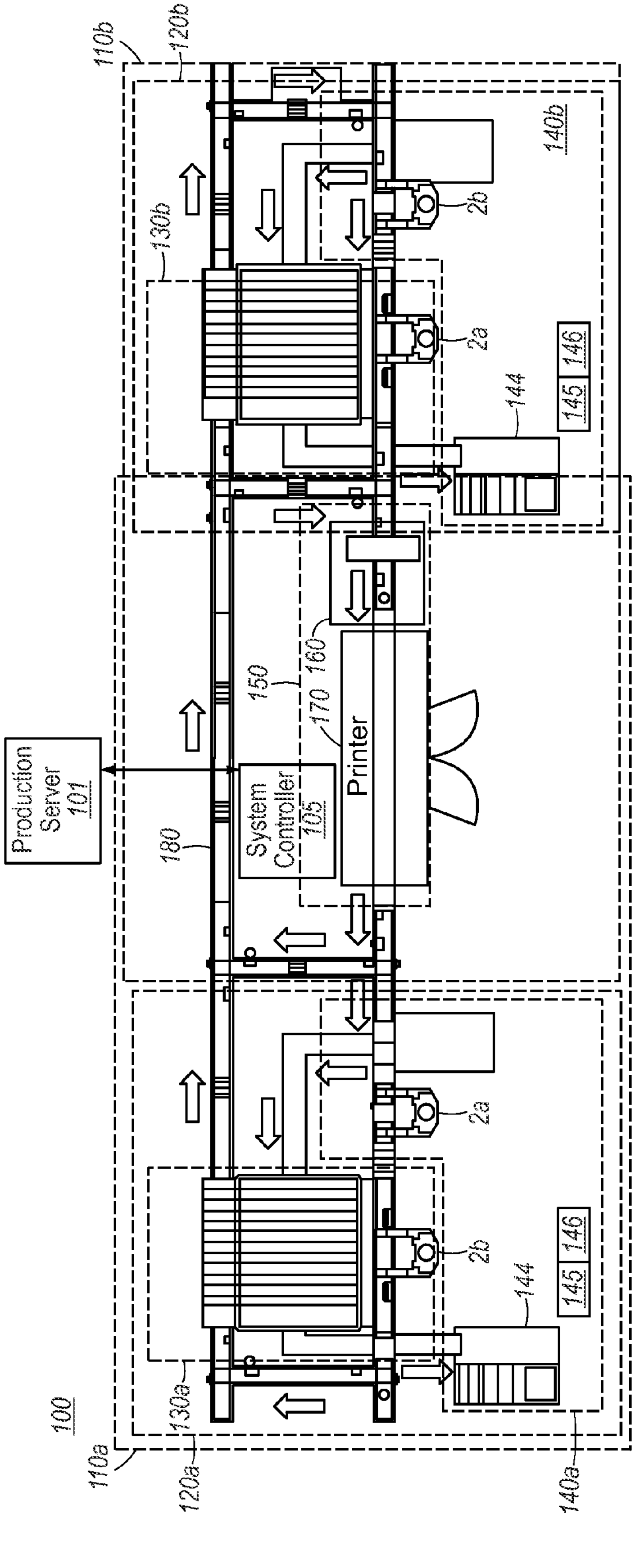
FIG. 1A is a top-down view.
Figure 1B:
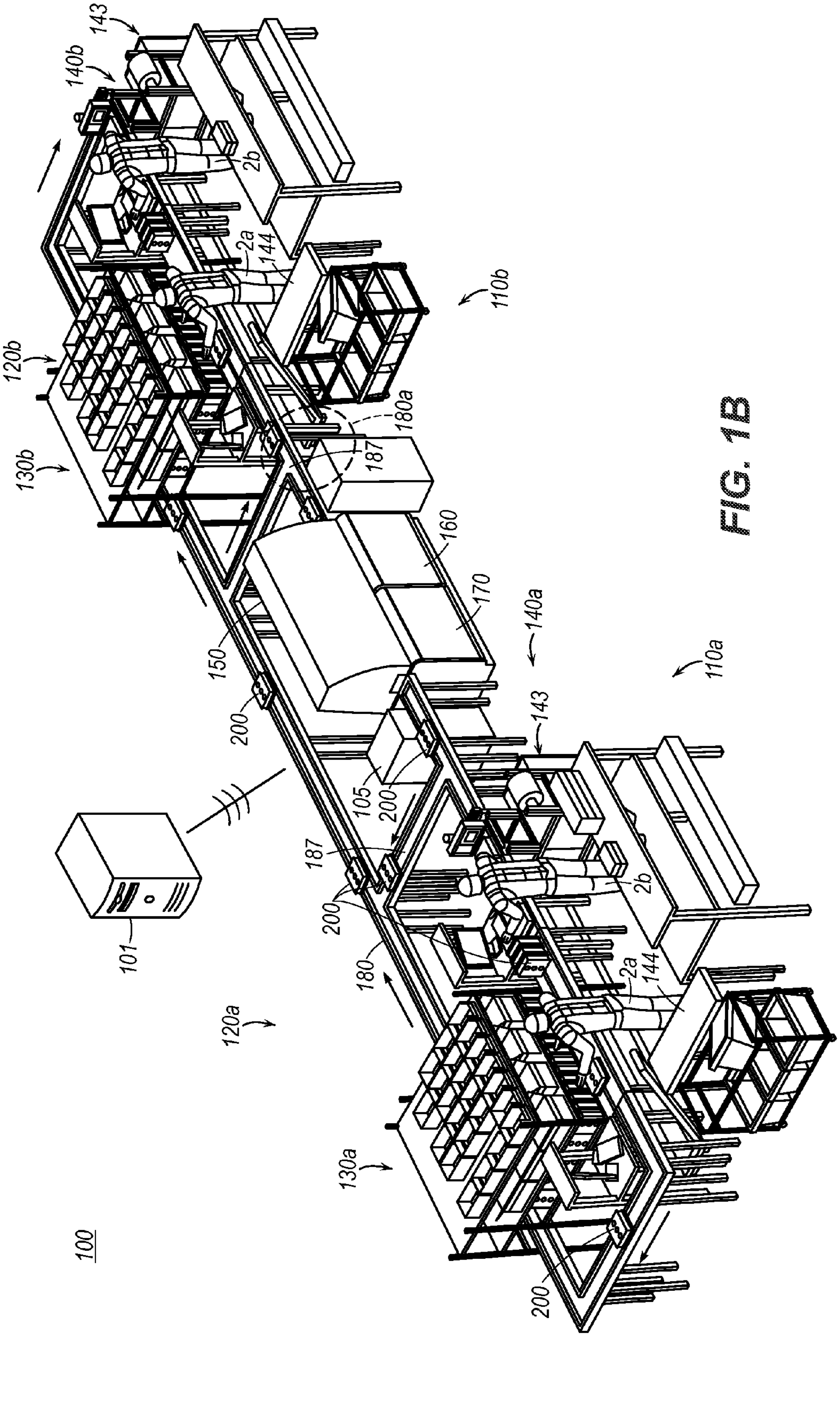
FIG. 1B is a perspective view of a schematic representation of an exemplary embodiment of a conveyance printing system.

Turning now to the drawings, FIGS. 1A and 1B show an exemplary embodiment of a novel continuous-flow conveyance printing system 100 with capability to print on multiple different types of articles of manufacture using the same printer, and to print potentially different image content on every article of manufacture, without requiring the printing system to stop or be taken offline between print jobs or between printing of different types of articles of manufacture.

In an embodiment, the continuous-flow conveyance printing system 100 operates to print customized images on promotional goods or items, typically characterized by, but not limited to, metallic and/or plastic surfaces. The continuous-flow conveyance printing system in the illustrative embodiments described herein is a production system for direct digital ink-jet printing on promotional items. The system can process a mixture of different promotional items and each item may be printed with a different design or image. The printed items are sorted and packaged on the system, and in some embodiments, direct shipments may even be processed and packed on the system.

In the embodiment shown in FIGS. 1A and 1B, the continuous-flow conveyance printing system 100 comprises two identically constructed production loops 110*a*, 110*b*, which supply and share a printing system 150 via a conveyance system 180. Of course, it is to be understood that other embodiments of the system may include only one production loop, or alternatively may include three or more such production loops. Each production loop 110*a*, 110*b* includes an independent operations area 120*a*, 120*b* comprising a loading station 130*a*, 130*b* and an unloading station 140*a*, 140*b*. The printing system 150 includes a pre-treatment system 160 and a printer system 170.

The Conveyance System

Figure 7B:
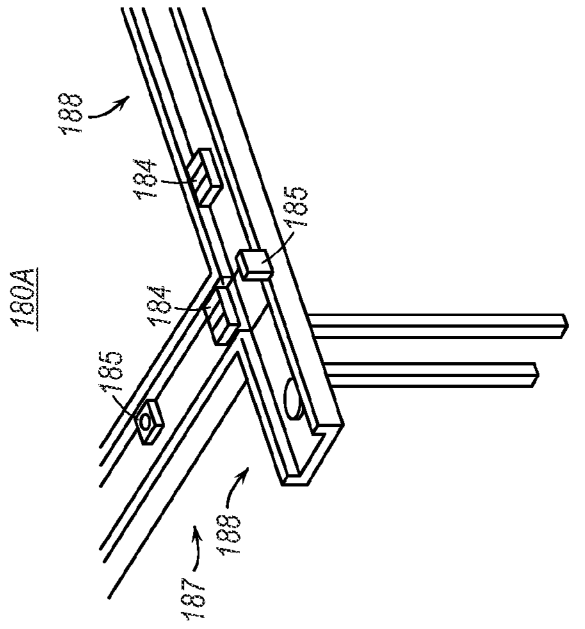
FIG. 7A is a top down view and FIG. 7B is a perspective view of a schematic representation of a section of the conveyance system which implements a transverse direction of the forward motion of the conveyor.
Figure 7A:
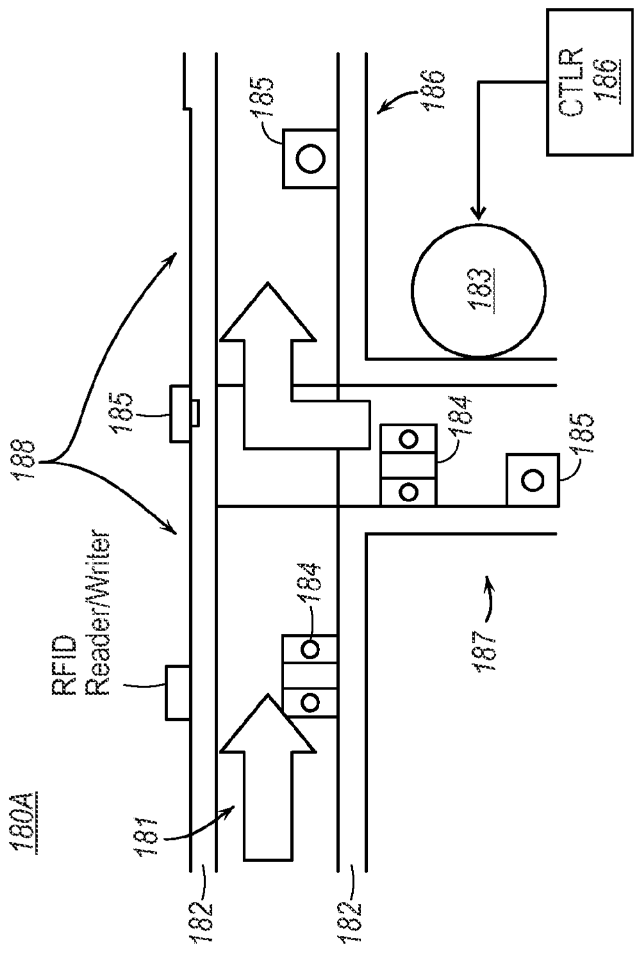

As best illustrated in FIGS. 7A and 7B, which show a small portion of the full conveyance system 180, including a portion of the main loop 186 and a portion of a transverse motion section 187 which allows a tray to bypass a section of the main loop 188, the conveyance system 180 includes a conveyor 181 such as a conveyor belt or roller chain(s), conveyor rail(s) 182 for supporting and guiding the conveyor 181, conveyor drivers 183 for driving the conveyor 181 in at least a forward (and potentially a reverse) motion, a plurality of removable print trays 200 for transporting articles of manufacture through the system 100 (see FIGS. 1A and 1B), pneumatic stoppers 184 for stopping movement of a tray 200 being transported on the conveyor 181, sensors 185 for monitoring the position(s) of the tray(s) 200 on the conveyor 181, controller(s) 186 for controlling the drivers 183 and stoppers 184 of the conveyance system, and transverse conveyance sections 187 for bypassing the main loop 188 of the conveyor system 180.

The conveyance system 180 transfers the print trays 200 in the two main loops from the loading stations 130*a*, 130*b* to the printing system 150 and then on to the unloading stations 140*a*, 140*b*, respectively. In an embodiment, the conveyor system 180 is implemented using a heavy duty steel belted conveyor, such as a modular transfer system manufactured by Bosch Automation Technology and Robert Bosch GmbH. Preferably, the conveyance system 180 transfers the trays 200 at a constant working height. For example, in one embodiment, the working height of transport may be 840 mm to provide optimal loading and unloading ergonomics for a standing operator 2*a*, 2*b* (referred to generally as 2).

The position of trays 200 along the conveyance path is determinable based on input from sensors 185, such as inductive or RFID sensors, positioned at strategic locations along the conveyance path (including the main loop 188 and transverse sections 187). Controllable stoppers 184 are positioned at strategic locations along the conveyance path to effect stopping (and controllable releasing) of the forward transport of trays 200 on the conveyor 181 at various predetermined positions along the conveyance path.

Trays

Figure 2A:
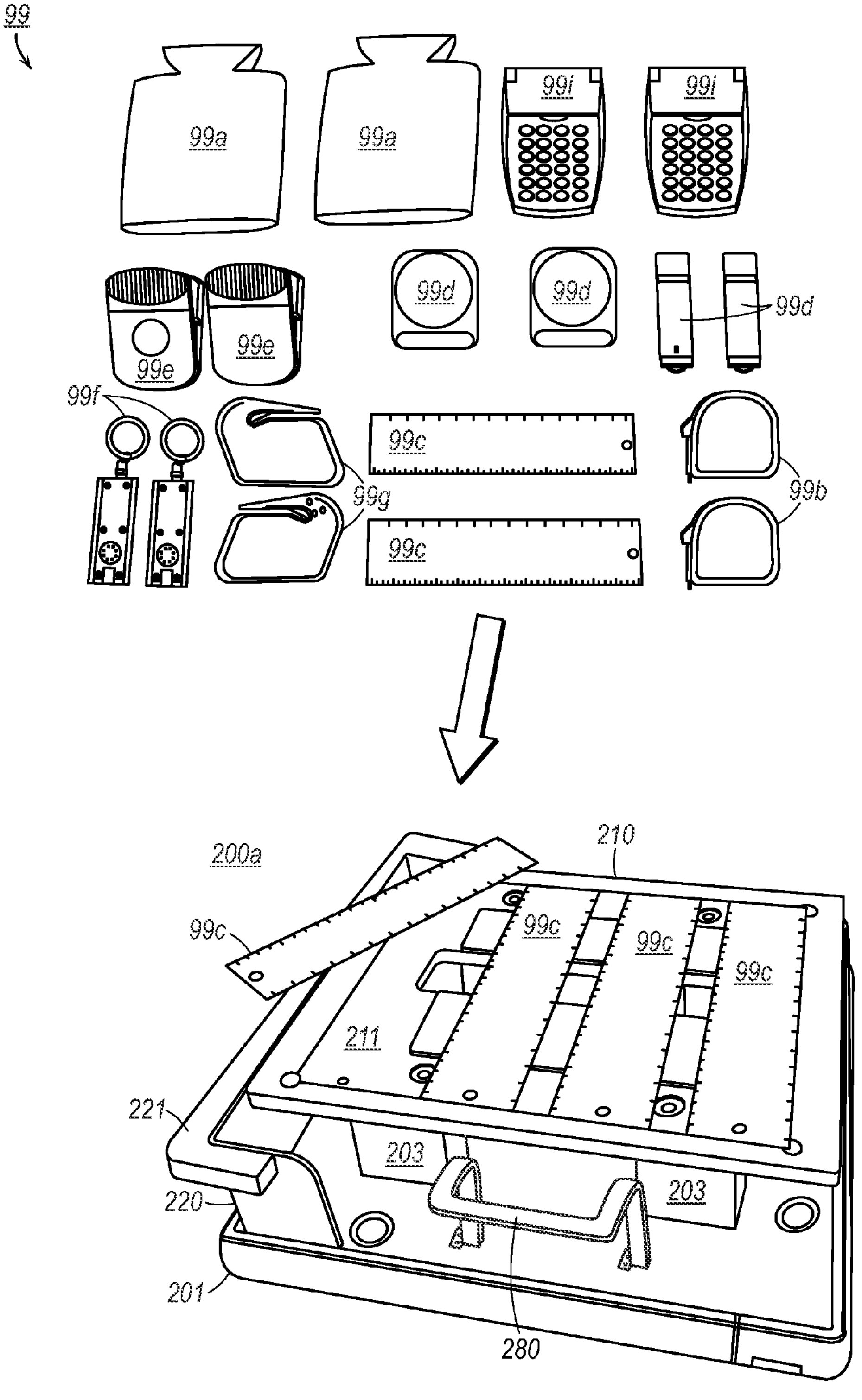
FIG. 2A is a perspective view of a schematic representation of an exemplary embodiment of a tray being loaded with articles of manufacture.

All articles of manufacture (also referred to herein as "articles") to be printed are conveyed on trays. Each tray is configured to hold one or more types of articles of manufacture (specific embodiments of which are shown in FIG. 2A as 99*a*-99*i*) in respective fixed positions as the tray 200 is conveyed through the system 100.

Figure 2B:
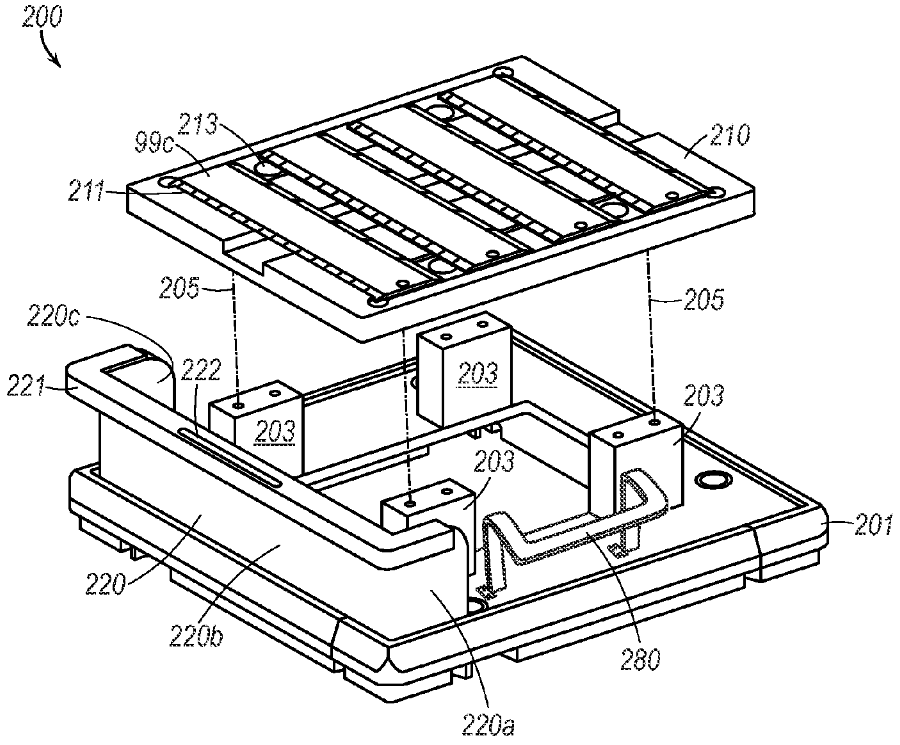
FIG. 2B is an exploded view of the tray shown in FIG. 2A.
Figure 2C:
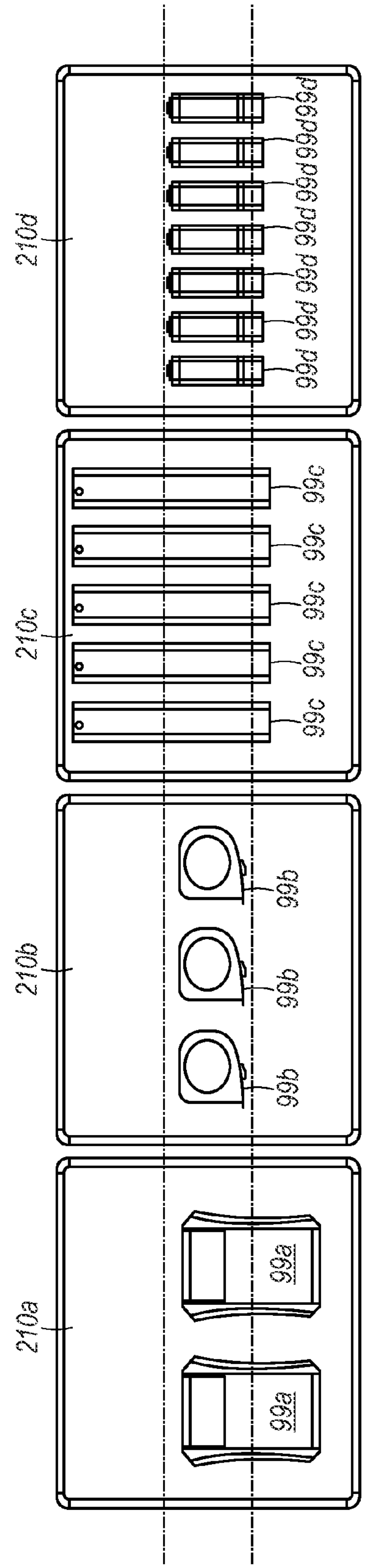
FIG. 2C is a top down view of a number of different tray inlays configured to hold different types of articles of manufacture.

FIGS. 2A-2E together illustrate an exemplary embodiment of a tray 200 for use in the system 100. In the exemplary embodiment, each tray 200 comprises a base plate 201 and a tray inlay 210, example embodiments of which are shown best in FIG. 2C at 210*a*, 210*b*, 210*c*, 210*d* customized for specific articles of manufacture 99*a*, 99*b*, 99*c*, 99*d*, respectively. The inlay 210 of the tray 200 is customized to carry a number of articles of manufacture 99 in dedicated slots 211 for each article 99. Each dedicated slot 211 of the inlay 210 is configured to consistently and accurately align a specific type of article of manufacture 99 in the tray inlay 210 of a tray 200 for correct print alignment, thereby preventing waste and re-print inefficiencies due to improper article alignment (which can cause printed images to be mis-positioned and/or to appear distorted). The number of articles 99 on a given tray inlay 210 will vary depending on the size of the tray inlay 210, the size of the article(s) 99, and other system parameters which affect how the articles may be positioned. For example, in an embodiment, one system parameter is the width of the printable area. In an example, the width of the printable area by the printer system 150 is 72 mm. As best illustrated in FIG. 2C, all articles 99 are positioned such that the target print area of each article is centered down the center line of the inlay 211. The number of articles 99 carried by one tray 200 can therefore range from one to many.

Figure 3:
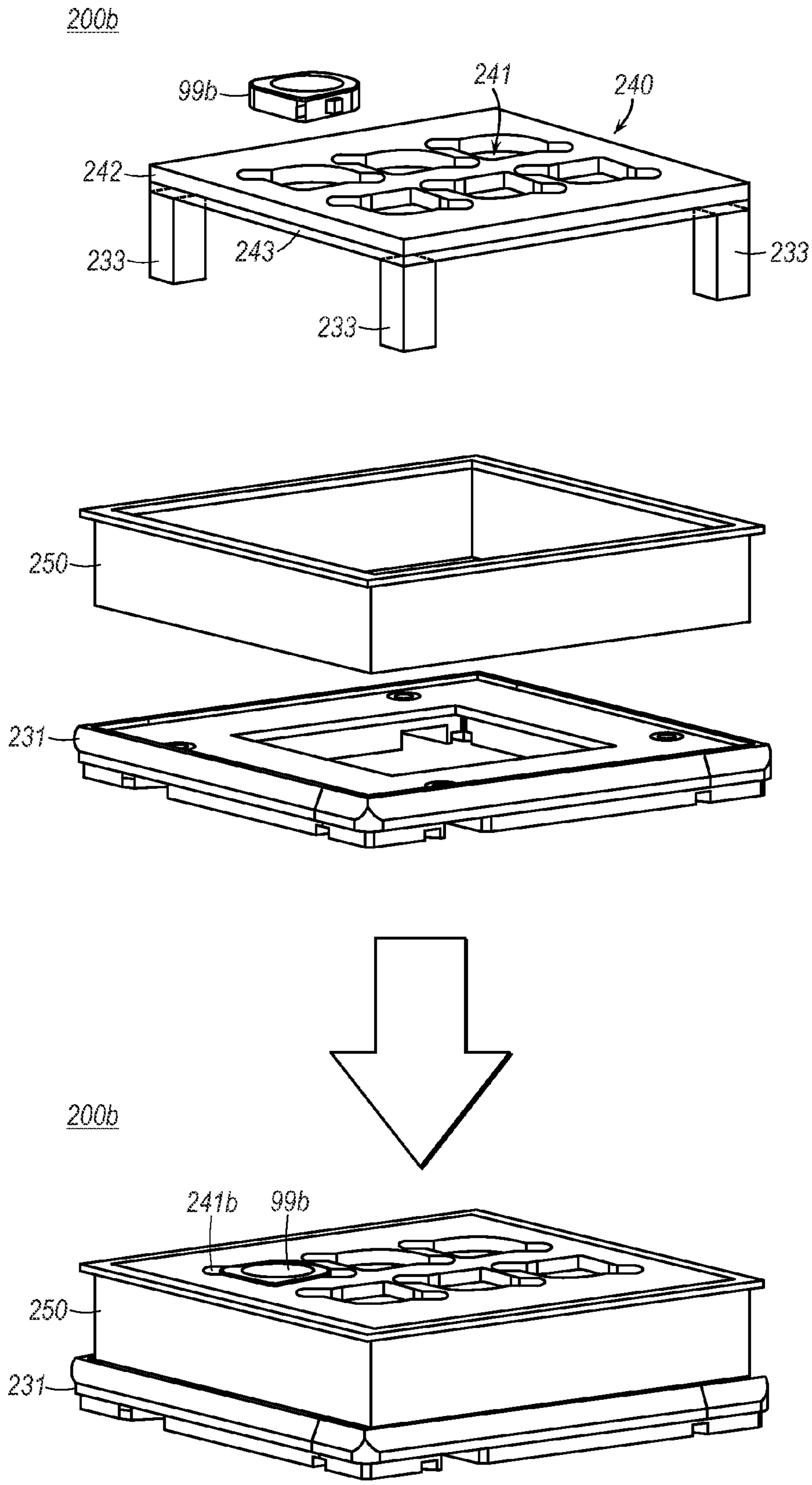
FIG. 3 is a perspective exploded view and its corresponding assembled view of a schematic representation of an alternative exemplary embodiment of a tray implemented in accordance with the invention.

Preferably, the tray inlay 210 is removable, such that one inlay 210*a*, 210*b*, 210*c*, 210*d* designed to hold a particular type of article of manufacture 99*a*, 99*b*, 99*c*, 99*d*, can be switched out of the tray 200 and replaced by another inlay 200 designed to hold a different type of article of manufacture 99. In an embodiment, each type of tray inlay 210*a*, 210*b*, 210*c*, 210*d* is designed to fit within a tray frame 220, which is universal to all types of inlays 210*a*, 210*b*, 210*c*, 210*d*. The tray frame 220 may literally be a frame which encases the outer side surfaces of the inlay 210. (See, for example, frame 250 in FIG. 3, which illustrates an alternative example embodiment 200*b* of a tray 200 which can be used in system 100). In such embodiment, the frame 220 includes an orifice that substantially conforms to the shape and size of the outer edges of the tray inlay 210 when the tray inlay 210 is placed flat within the frame with the slots 211 facing up and ready to receive articles of manufacture 99 to be printed.

Alternatively, the tray frame 220 may include only one or more frame side members 220*a*, 220*b*, 220*c* which are configured to encase only a portion of the outer side surfaces/edges of the inlay 210. For example, in an embodiment, the tray frame 220 comprises a main frame member 220*a* positioned along or near one edge of the base plate 201 and having two sub-members 220*b*, 220*c* perpendicularly arranged along or near the transverse edges of the base plate 201. The perpendicularly arranged sub-members 220*b*, 220*c* may be connected at one end to respective opposite ends of the main frame member 220*a*. The inner surfaces of the main frame member 220*a* and perpendicularly arranged sub-members 220*b*, 220*c* engage three of the outer edges of the inlay 210, providing both support and alignment assistance for the inlay 210 with respect to the frame 220. In addition to, or instead of the embodiments described herein, the frame 220 may take other forms. For example, in an exemplary embodiment, the tray includes a handle 280 which allows the operator 2 to manipulate the tray 200, for example when inserting or removing the tray 200 into a tray rack lane 135 (discussed hereinafter), or when flipping the tray from a vertical position to a horizontal position for use, or vice versa for storage (also discussed hereinafter).

In an embodiment, the tray 200 is designed to position the target print surface of the article(s) 99 loaded in the tray inlay 210 of the tray 200 at a constant height as the tray is conveyed along the conveyor 181 regardless of the specific type of article of manufacture 99 that is loaded in the tray 200. For example, in one embodiment, each type of inlay 210*a*, 210*b*, 210*c*, 210*d*, is configured to position the target print surface(s) of any articles of manufacture 99*a*, 99*b*, 99*c*, 99*d* loaded therein to be within a known distance of the known height of the print head nozzles when the tray is conveyed through the printer system 170. For example, if the known height of the print head nozzles in the printer system 170 is 81 mm above the conveyor which passes under the print head(s) in the printer system 107, the inlays 210 may be configured such that print surface(s) of the articles of manufacture 99 when loaded on the tray 200 have a height of 80 mm when the tray is mounted on the conveyor running under the print head(s).

In one embodiment, a constant print surface height across all types of inlays 210*a*, 210*b*, 210*c*, 210*d*, is achieved by way of one or more vertical positioning spacers 203*a* positioned between the base plate 201*a* and the inlay 210*a*. Different types of inlays 210 may use positioning spacers 203 of different heights, as controlled by the shape and size of the particular article of manufacture 99*a*, 99*b*, 99*c*, 99*d* for which the particular inlay 210*a*, 210*b*, 210*c*, 210*d* was designed to carry.

Figure 2D:
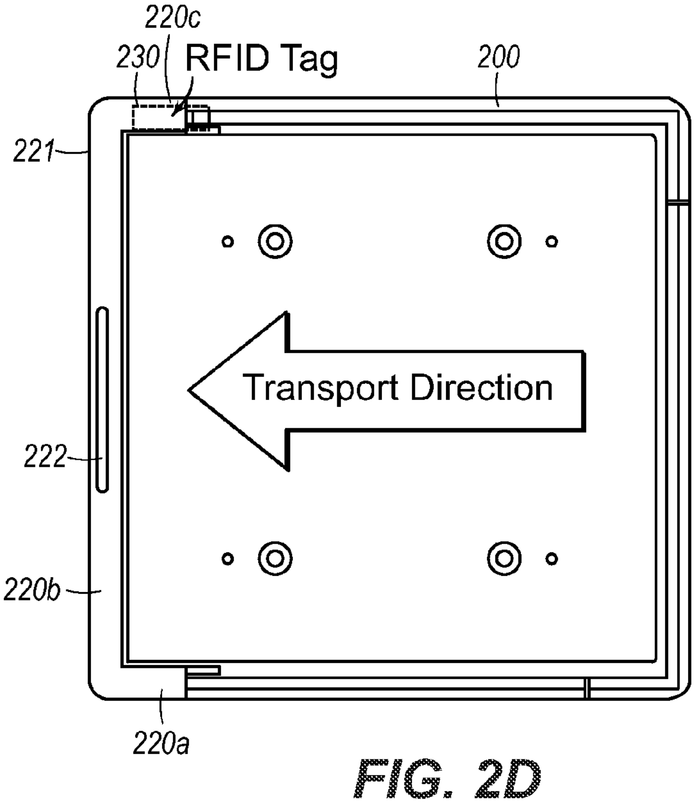
FIG. 2D is a top down view of the tray of FIG. 2A shown without a tray inlay placed therein.
Figure 2E:
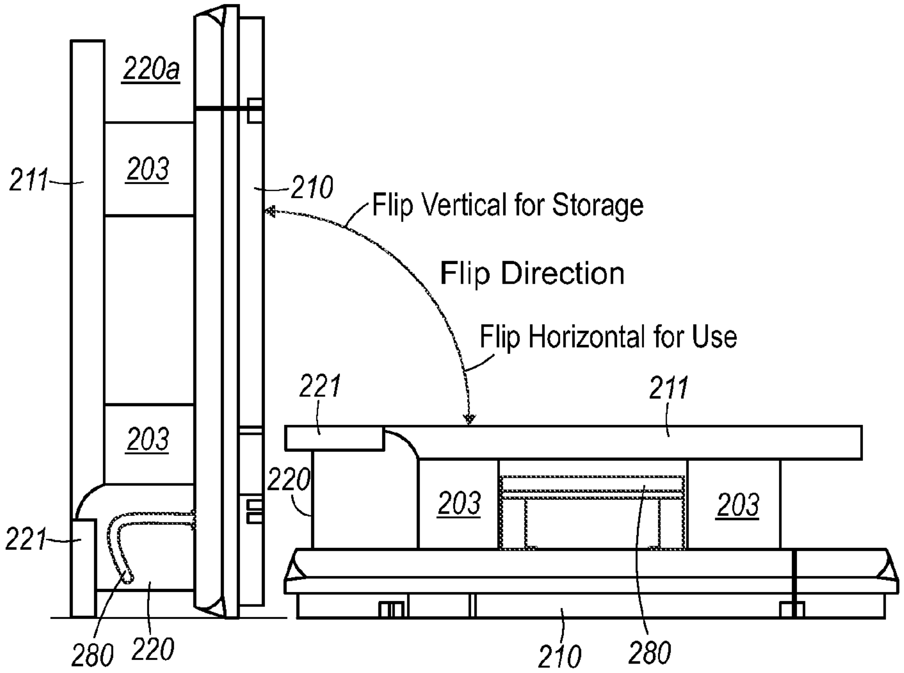
FIG. 2E is a side view of a tray illustrating a horizontal usage orientation and a vertical storage orientation.

In one tray design, for example as best illustrated in FIGS. 2A, 2B and 2E, the vertical positioning spacers 203 attach at one end to the base plate 201 and at the other end to the underside of the inlay 210 by way of screws or bolts. In an alternative tray design, for example as illustrated in an alternative tray embodiment 200*b* in FIG. 3, the tray inlay 240 includes a slotted plate 242 having slots 241 which conform to an outer shape of a cross-section of the articles of manufacture for which it is designed to hold. The slotted plate 242 is mounted over a support plate 243, which is configured to support the articles of manufacture 99 loaded therein such that the printing surface(s) of the loaded articles is maintained at a predetermined height relative to one or more points on the tray, while also preventing the articles loaded thereon from falling through the respective slots 241. In one embodiment where the articles to be loaded thereon are flat and thin, the support plate 243 may be a flat solid sheet of material with orifices embedded therein whose shapes correspond to the shapes of the outer edges of the articles of manufacture. In other embodiments, where the articles of manufacture to be loaded on the inlay 240 varies in shape in the 3$^{rd}$ dimension when the print surface of the article is flat and constant along a plane parallel to the plane defined by the 1$^{st}$ and second dimensions defined by the flat surface of the inlay, the support plate 243 may include molded cavities which conform to the shape(s) of the portion(s) of the articles of manufacture that are to be supported by the support plate 243. The height requirement for the print surface(s) of the articles of manufacture may be achieved by shaping the molded cavities and slots so as to fix the article of manufacture 99 in a position such that the target print surface(s) of the article are at the required height relative to one or more points on the tray. Alternatively, the required height of the print surfaces of the loaded articles may be achieved by affixing vertical positioning spacers 233 to the bottom of the inlay 240. When vertical positioning spacer(s) 233 are used, the height of the spacers 233 are chosen such that the height of the target print surface(s) of the articles of manufacture 99 mounted thereon meet the height requirements.

FIGS. 2A-2E and 3 together illustrate a plurality of exemplary trays, each for holding a different type of article of manufacture 99. As illustrated, each tray inlay 210*a*, 210*b*, 210*c*, 210*d*, 241 is designed specifically to hold one or more specific types of articles of manufacture such that the print surface(s) of the held articles of manufacture are at a specific height relative to the conveyor belt. Since different articles of manufacture have different thicknesses and shapes, in general each type of article of manufacture will have a corresponding different tray inlay specifically designed to hold that particular type of article of manufacture. In a preferred embodiment, the tray frame is 250 mm square, and each inlay is configured to hold one or more articles of manufacture positioned such that when the tray 200 is conveyed through the printing sys 150, the target print surfaces area positioned down the center line of the available printable width of the print system 170.

In an embodiment, each tray is identified with an identifier 230 from which information needed to process the tray 200 and/or the articles of manufacture 99 loaded thereon can be read or derived. Various detectable identifiers are known in the art and any detectable identifier can be used to implement the tray identifier. In one embodiment, the identifier 230 is a Radio Frequency Identification (RFID) tag, and is identified by an RFID reader, positioned along the conveyance path, in combination with a controller. In another embodiment (not shown), the identifier 230 is a barcode which is detected by a barcode reader. In yet another embodiment (not shown), the identifier 230 is a Near Field Communications (NFC) tag which is detected by an NFC tag reader. The tray identifier 230 may be variously embodied using other technologies now known or developed in the future. The tray identifier 230 is used to extract various items of information needed to process the articles of manufacture 99 correctly through the system 100.

The Operations Area

Returning to FIGS. 1A and 1B, each independent operations area 120*a*, 120*b* is configured to allow one or more operators 2 (shown as 2*a* and 2*b*) to fill empty trays 200 with unprinted articles of manufacture 99 (such as, but not limited to, promotional items) and to send loaded outgoing trays 200 out onto the conveyance system 180 for conveyance to the printing system 150, unload printed articles from trays incoming from the printer, and scan, sort and package the printed articles. In an embodiment, the operators 2 are human, but in other embodiments, one or more tasks performed by the human operators 2 may be automated, for example through automated machinery and/or use of robotics.

Loading Station

Figure 4A:
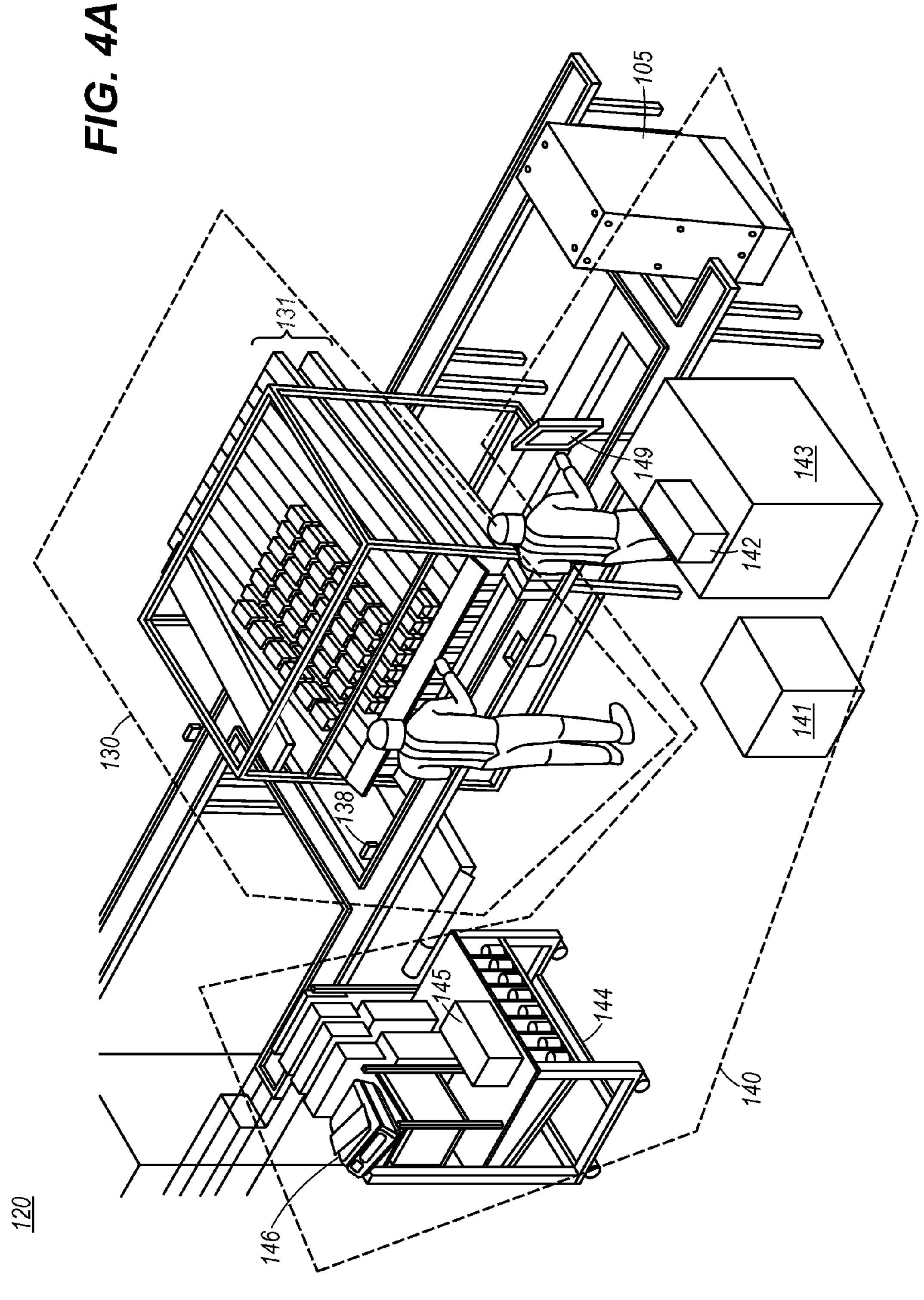
FIG. 4A is a top perspective view of a schematic representation of an embodiment of a loading station.
Figure 4B:
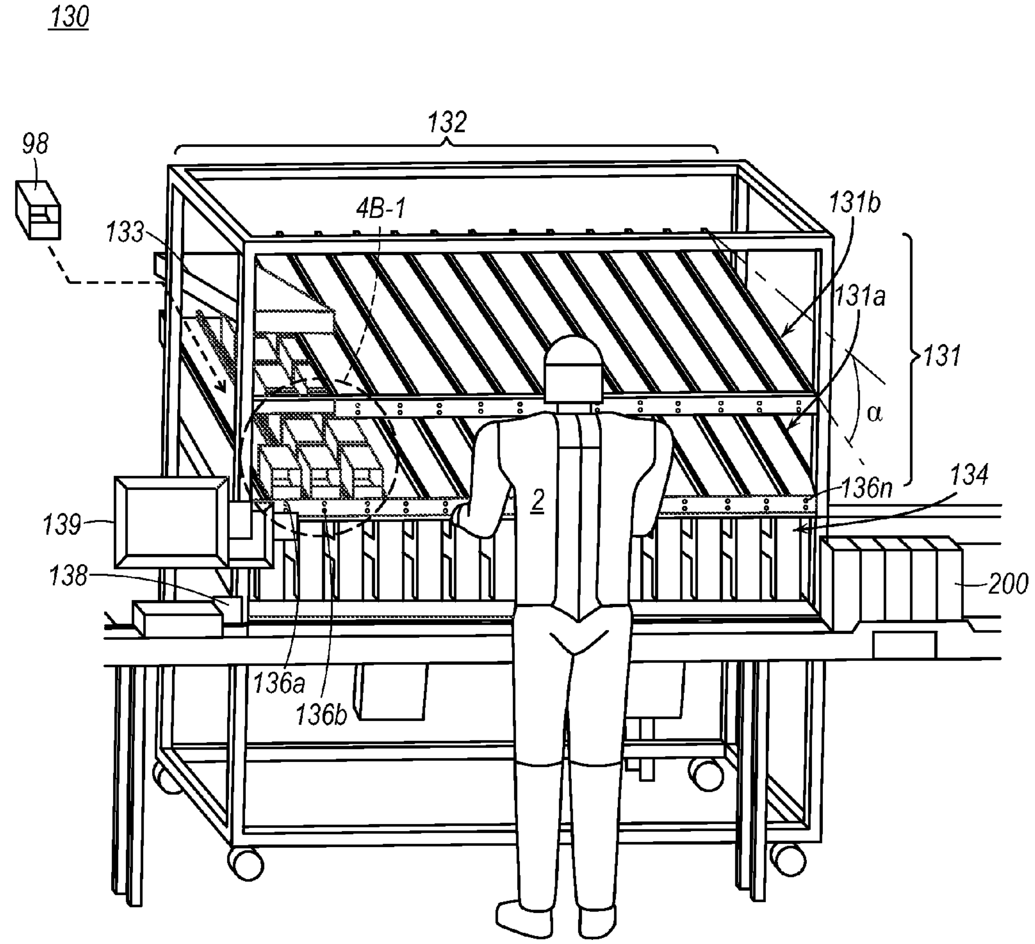
FIG. 4B is a front perspective view of the loading station of FIG. 4A.
Figures 1, 4B:
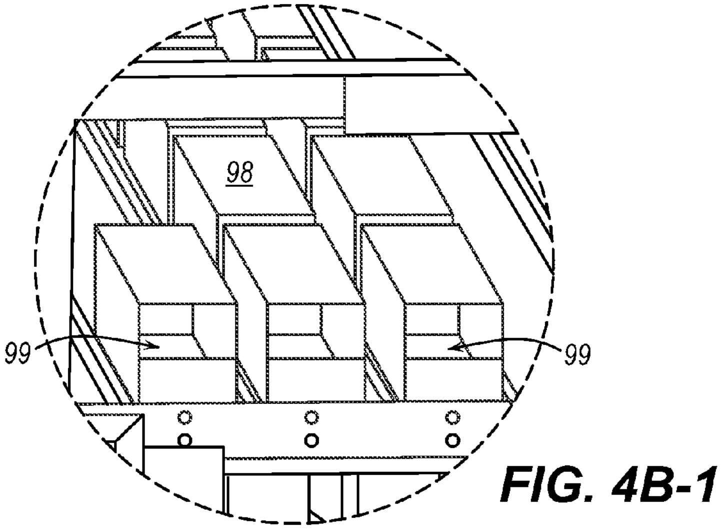
Figure 4C:
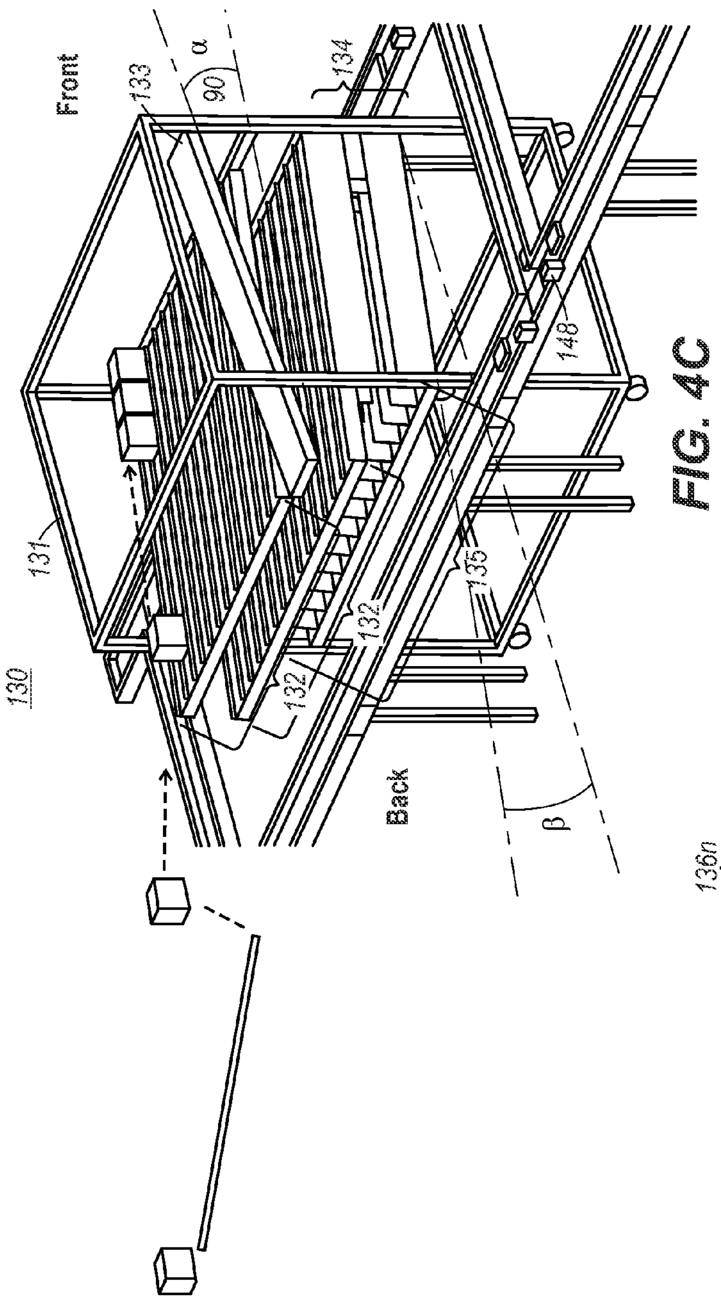
FIG. 4C is a rear perspective view of the loading station of FIG. 4A wherein the article of manufacture rack and the tray rack are empty of articles of manufacture and empty of trays.

FIGS. 4A, 4B and 4C illustrate an exemplary embodiment of a loading station 130 which may be used in connection with the operations area(s) 120*a*, 120*b* of the system. The loading station 130 includes a flow rack 131 for storing, and delivering to the operator 2, blanks (unprinted) of the various types of articles of manufacture 99 to be printed by the system 100. In an embodiment, the flow rack 131 comprises a plurality of lanes, referred to hereinafter as blank article lanes 132*a*, 132*b*, . . . , 132*m*, (or simply 132) which are loaded and filled from the back of the rack 131 (shown in FIG. 4C) and pulled out and removed from the front of the rack 131 (shown in FIGS. 4A and 4B). The blank article lanes 132 are preferably configured to be tilted downward toward the front of the rack 131 at an incline (angle 13) so that as article blanks 99 are removed at the front of the rack 131 from a blank article lane 132 for loading into a tray, the remaining article blanks 99 in the lane slide forward toward the front of the lane due to the operation of gravity. This allows for easy access by the operator 2 loading the trays 200. In an embodiment, articles of manufacture 99 are packaged in bulk in boxes 98. When a blank article lane 132 is loaded with a particular type of unprinted article of manufacture 99, one or more bulk-pack boxes 98 are opened and placed in a lane 132 which is dedicated to that particular type of article of manufacture. The box(es) 98 are preferably loaded from the back of the rack. As box(es) 98 are emptied and removed from the lanes 132, the remaining box(es) slide forward and down the incline of the lane 132 via gravitational pull.

Every type of article of manufacture 99 (e.g., each different type of promotional article 99*a*, 99*b*, 99*c*, 99*d*) has one or several dedicated blank article lane(s) 132*a*, 132*b*, . . . , 132*m*. The blank article lanes 132 may be organized on one or more multiple levels. In the embodiment shown in FIG. 1, the blank article lanes 132 occupy two levels 131*a*, 131*b*, with multiple lanes 132 on each level.

In an embodiment, the flow rack 131 includes at least one (as shown) or multiple (not shown) interstage lane 133 configured with a reverse inclination (at angle $\alpha$) towards the back of the flow rack 131. The interstage lane 133 is used to gravitationally transport empty raw material boxes 98 from the front of the flow rack 131 to the back of the flow rack 131 for collection and transport outside of the operations area 120.

The loading station 130 also includes one or more tray rack(s) 134 for storing empty trays 200 ready to be filled with blank articles of manufacture 99. In a preferred embodiment, the tray rack 134 is stacked below the blank article rack(s) 131*a*, 131*b*. As explained in detail above, each tray 200 includes an inlay 210 configured to hold a particular type of article of manufacture 99 (such as a promotional item). The inlay 210*a*, 210*b*, 210*c*, 210*d* for each type of article 99*a*, 99*b*, 99*c*, 99*d* may be different. Preferably, the tray rack 134 includes a plurality of lanes, called tray lanes 135*a*, 135*b*, . . . , 135*n*, referred to generally as 135, located underneath and in positional correspondence to various ones of the blank article lanes 135*a*, 135*b*, . . . , 135*m* of the flow rack. In this embodiment, trays 200 having inlays 210 configured to hold a particular type of article 99 are preferably stored in a tray lane 135 directly beneath a corresponding respective blank article lane 132 dedicated to the specific type of article of manufacture 99 that the tray inlay 210 is configured to hold.

In an embodiment, the trays 200 are stored in the tray lanes 135 standing on one side. This allows more trays 135 to be stored in the tray rack 134 per lane 135. FIG. 2D best illustrates the desired tray orientation for storage (vertical) and for active use (horizontal). The trays 200 are stored in vertical orientation (up on one side) in their tray lanes and are flipped horizontal by the operator 2*a* prior to being loaded with blank articles of manufacture 99 of the type for which the inlay 210 of the tray 200 has been designed to hold. During loading, the conveyance system 180 is configured to allow the tray 200 to rest on the conveyor rails 182 without being conveyed forward. After loading the tray 200 with blanks 99, the operator 2*a* releases the tray 200 to be conveyed forward by the conveyance system 180 for print processing. During unloading, the conveyance system 180 is configured to allow the tray 200 to rest on the conveyor rails 182 without being conveyed forward. After the operator 2*b* removes the printed articles from the stopped tray 200, the operator flips the tray from the horizontal position to the vertical position, as illustrated in FIG. 2D.

Returning to FIGS. 4A-4D, the blank article rack 131 and tray rack 134 are preferably positioned adjacent the conveyance system 180 and in particular such that the blank article lanes 132 and tray lanes 135 open onto the conveyor 181. This allows an operator 2*a* standing in front of the racks 131 and 134, and in particular, in front of the openings of the lanes 132, 135, with the conveyor 181 passing therebetween, to easily select and ergonomically remove a tray 200 from a tray lane 135 and place it onto the conveyor 181 in one easy motion, load the tray 200 with articles 99 removed from the blank article lane 132 above the selected tray lane 135, and release the tray 200 for transport by the conveyance system 180. In an embodiment, the tray rack 134 is positioned and/or stacked below the flow rack 131 such that the bottoms of the openings of the tray lanes 135 are the same height as the conveyor rails 182. In an exemplary embodiment, the height of the conveyor rails off the floor is 840 mm, and the width of the conveyor 181 (and including outside width of the conveyor rails) is 250 mm. The height off the floor of the bottoms of the openings of the lower row of tray lanes 131*a* is 1150 mm. The height and width of the conveyor, and the heights and setup of the tray and articles racks, are designed for optimal loading ergonomics. As best seen in FIG. 4E, the operator can therefore stand in an upright position (i.e., with optimal posture), and, without extending or raising the upper arm(s) or moving the upper body or shoulders, reach across the conveyor to grasp a tray 200 from a tray lane 135, pull it out of the tray lane 135, and lay it horizontal into the loading position on the conveyor 181.

In an embodiment, the loading station 130 includes one or more indicators 136 to indicate which type of articles of manufacture 99 are to be loaded onto corresponding trays 200. In an embodiment, the loading station is configured with an indication panel 190 having one or more indicators 136 corresponding to each tray lane 135. In this embodiment, trays 200 queued in the tray lane 135 are dedicated to a particular type of article of manufacture 99. Thus, all trays 200 stored in the particular tray lane 135 are configured with an inlay 210 which is designed to hold the particular article type for which the tray lane is dedicated. When the indicator 136 of a particular tray lane 135 indicates that a tray 200 in its lane should be loaded, the operator removes a tray 135 from the indicated lane, removes one or more articles 99 from the corresponding blank article lane (which are of the type for which the inlay 210 of the selected tray 200 was designed), and loads the tray 200 with the selected article(s) 99.

In an alternative embodiment (not shown), the loading station 130 is configured with one or more indicators 136 corresponding to each blank article lane 132. In this embodiment, when an indicator 136 associated with a blank article lane 132 indicates that a tray 200 should be loaded with articles 99 of the type contained in the indicated lane 132, the operator 2*a* removes a tray 200 from a tray lane 135 corresponding to the indicated blank article lane (which contains trays of the type configured to hold the indicated article type), removes one or more articles 99 from the indicated blank article lane 132, loads the selected tray 200 with the selected article(s) 99, and launches the loaded tray 200 for print processing by releasing the tray 200 onto the conveyance system 180. In an embodiment, the conveyance system 180 includes stoppers 184 which automatically stop a tray in front of the loading station 130. The stopper 184 is manually disengaged by the operator 2*a* at a push of a button.

Figure 4D:
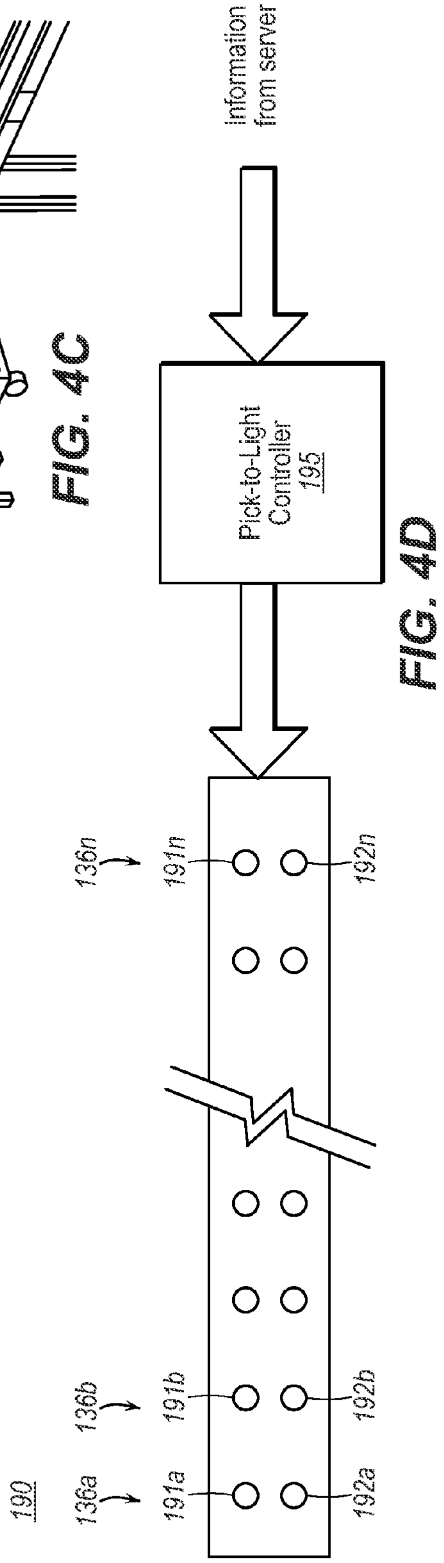
FIG. 4D is a block diagram of a schematic representation of an exemplary pick-to-light system.
Figure 4E:
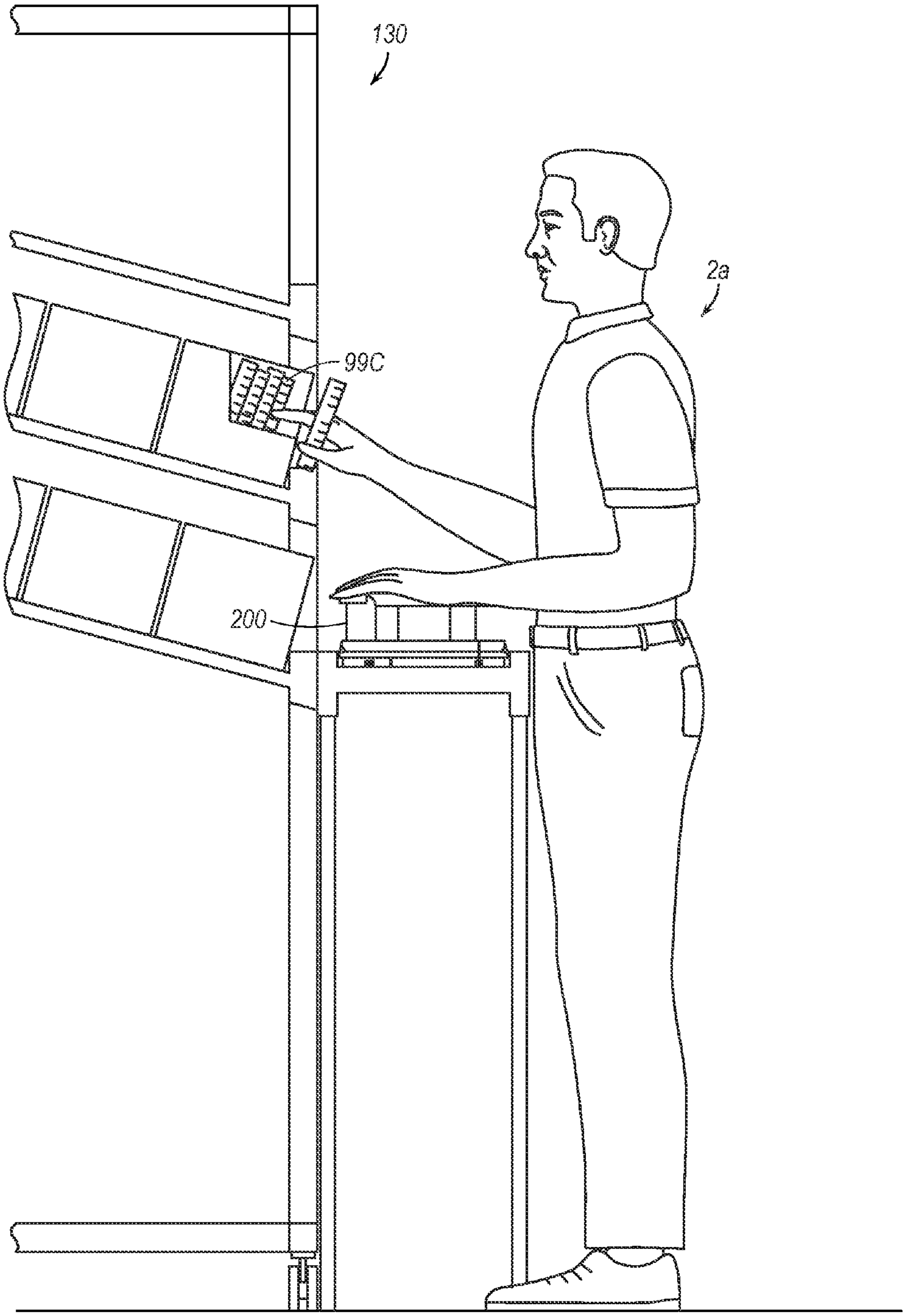
FIG. 4E is a side view of the loading station of FIG. 4A.

In a specific embodiment, illustrated in FIG. 4D, the indicators 136 are implemented in what is herein termed a "pick-to-light" system, or light indicator panel 190. The pick-to-light system 190 supports the operator in picking the correct trays 200 from the tray rack 134 and/or articles 99 from the blank article rack 131, and shortens the reaction time of the operators 2 to increase operations efficiency. In an embodiment, each indicator 136 comprises one or more lights, such as LEDs, that turn on, turn a specific color, and/or flash in a particular sequence, when the tray lane 135 (and/or a blank article lane 132) is to be selected by the operator. A controller 195 controls the turning on and off of the indicators. The controller 195 is configured with intelligence as to what type of trays 200 are stored in each tray lane 135 and/or what types of articles of manufacture are in each blank article lane 132. The controller 195 is further configured to be in communication with the system controller 105 and/or production server 101 to receive information as to what type of tray 200 is to be loaded next in the production process. In one embodiment, as best illustrated in FIG. 4D, the pick-to-light system 190 includes one yellow 191*a*, 191*b*, . . . , 191*n*, and one green 192*a*, 192*b*, . . . , 192*n*, light signal for each lane of the tray rack. The light signals can have the following states:

| Green Light State | Yellow LightState | Signal Meaning |
|---|---|---|
| Steady On | Off | Current article type to print. Load predetermined number of trays. |
| Blinking On | Off | Current article type to print. Load single tray. |
| Steady, Blinking or Off | Steady On | Next article type to be printed will be on this tray. |
| All lanes simultaneously blinking | All lanes simultaneously blinking | A warning signal. Check the display screen for details. |
| Off | Blinking | Emergency-Stop button has been pressed on the system. |

In and embodiment, the loading area 120 includes a tray identifier reader 138, such as RFID or barcode reader, which scans the tray identifier 230 associated with the tray 200 prior to, during, or after loading of the blank articles into the tray 200. The scanned tray identifier 230 (or signal or other information from which the value of the tray identifier can be derived) is sent to the system controller 105, which in one embodiment is in communication with a production server 101 which matches the scanned tray identifier 230 with a particular print job as will be discussed in further detail hereinafter. The print job can be a single print job or an aggregate print job containing multiple individual print jobs. When the print job is an aggregate print job containing the one or more designs which are to be simultaneously printed on multiple respective articles loaded in the tray 200, the production server 101 also associates the position of each article in the tray with a corresponding customer order.

In an alternative embodiment (not shown), each slot 211 in the tray inlay 210 is configured with an identifier, such as an RFID tag, a barcode, etc. An identifier reader, such as RFID or barcode reader, scans the identifier associated with each tray inlay slot prior to, during, or after loading of the printed article in order to associate the article of manufacture 99 directly with a customer order.

The loading station 130 may include one or more control screens 139 which function as a communication interface between the system controller 105 and/or production server 101 and the load operator 2*a*. System status, the required trays, warnings and other information may be displayed on the screen to convey information to the operator 2.

Unloading Station

Figure 6:
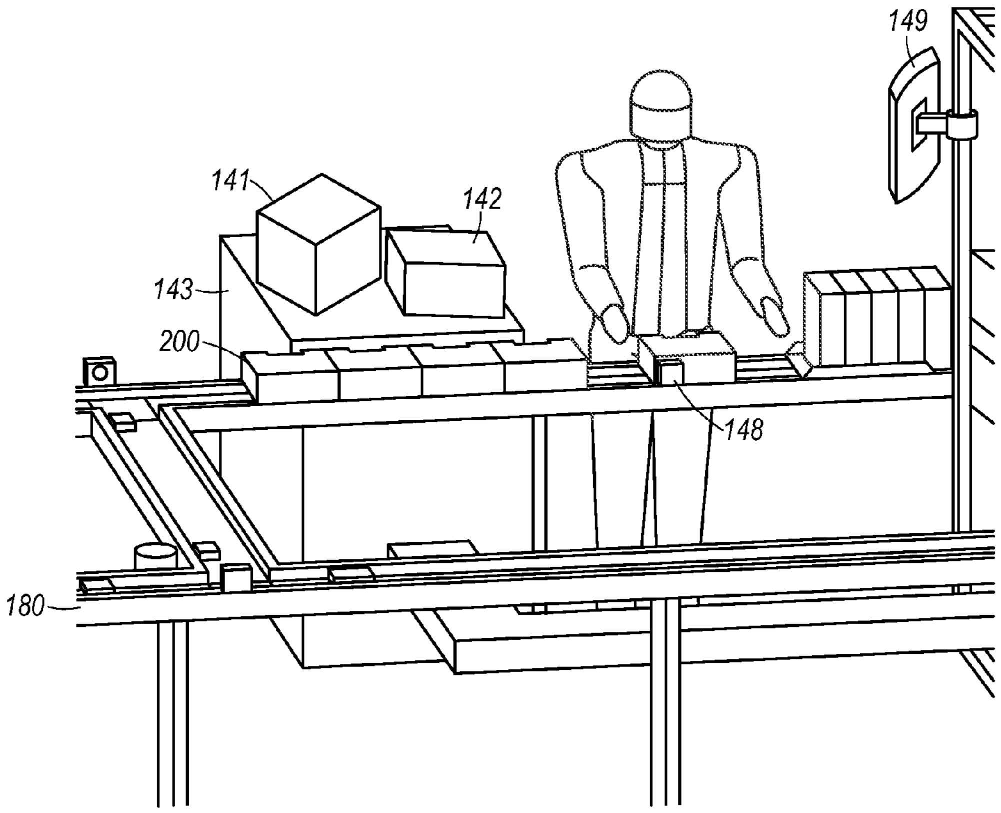
FIG. 6 is a view of a schematic representation of an unloading station.

As best illustrated in FIGS. 1A, 1B and 6, the unloading station 140*a*, 140*b*, referred to generally as 140, preferably includes an identifier reader 148, a display or control screen 149, an order summary printer 141, a labeler 142, and a packaging system 143, and may further include a sorting and packing table or station 144, a shipping label maker 145, and a postage machine 146. The unloading station 140 is operated by one (or more) operator(s) 2*b*. In an embodiment, the load operator 2*a* and the unload operator 2*b* are different people. Furthermore, there may be more than one load operator 2*a* and/or more than one unload operator 2*b* to perform the load and unload functions. In an alternative embodiment, the load operator 2*a* and the unload operator 2*b* may be the same person. The purpose of the unloading station 140 is to assist an operator 2*b* to unload articles 99 from a tray 200 arriving from the printing system 150, to collect the processed articles 99 associated with each customer order, to generate and/or receive an order summary form, to package the individual articles associated with the individual customer order(s), and to bundle the packaged individual articles of each customer order into one or more shipment units. In an embodiment, the unloading station 140 may also include an area for packaging the shipment units into shipping packages, applying shipping labels and postage for sending the packages out for shipping.

In an embodiment, the identifier reader 148 scans the tray identifier 230 of each tray 200 arriving from the printing system 150. The identifier reader 148 may be mounted along the conveyance system 180 in a position to read the identifier of each incoming tray 200, or may be a hand scanner (not shown) operated manually by the unload operator **2*b*. The scanned identifier 230 is communicated to the controller 105 or to the production server 101 or other control system, which matches the scanned identifier to one or more customer orders associated with the printed articles 99 in the tray 200. The control screen 149 displays for the operator 2*b* an indication of which printed article(s) 99 should currently be removed from the scanned tray 200 for packaging and processing. The control system 105 or production server 101 then automatically generates an order summary associated with the customer order and signals the order summary printer 141 at the unload station 140 to print the order summary and the labeler 142 to print one or more labels associated with and identifying the removed article(s) 99. The label(s) may be applied directly to the removed article 99 or alternatively to the packaging for the article(s). In an embodiment, the unload station includes a packaging system, such as an automated bagger 143. In an embodiment, the order summary form and one or more of the printed article(s) associated with the particular customer order are input to the automated bagging system 143 and the label(s) are applied to the bag(s). In an embodiment, the bagging process by the automated bagger is triggered by a touch switch operated by the unload operator 2*b***. However, in an alternative embodiment, the bagging may be performed automatically without operator assistance or input.

Preferably, the unload operation is guided by a pick-to-screen process. The control screen 149 at the unloading station 140 indicates the number and the position of the articles 99 on the trays 200 that belong to the same customer order and are to be put together in one bag. In an embodiment, the identifier reader 148 is a RFID reader and is used to scan the RFID tray identifier 230. In an alternative embodiment, the identifier reader 148 is a hand scanner which is used by the unload operator **2*b* to scan the identifier corresponding to a respective slot on the tray to identify which of the printed articles on a given tray is being unloaded by the operator. The information is used by the production server 101 or system controller 105 to command the order summary form printer 141, automatic bagger 143, and label printer 142**.

At the sort/pack table 144 the bags are collected. The bags are scanned, sorted, and in case of direct shipments the bags are packed in cardboard boxes. Automatically printed labels are applied to the boxes.

Operator Operations and Ergonomics

The construction and placement of the loading and unloading stations and conveyance system are designed with particular attention to operator ergonomics and time operating efficiency. Referring to FIG. 4E, the height of the tray rack lanes 135 and conveyor 181 passing in front of the tray rack 134 is preferably approximately hip-high for an average human operator. In an embodiment, the conveyor height is 840 mm above the floor on which the operator stands. This allows the human operator **2*a* to stand upright with good posture with minimal movement of the upper arms and shoulders when handling the trays incoming form the printing system 150, flipping the trays 200 from a horizontal position to a vertical position, and returning empty trays 200 to the tray rack 134. On the load side, the operator 2*a* can also perform the operations of removing trays 200 from the tray rack 134, flipping the removed trays from a vertical to a horizontal position, loading the trays 200 with articles of manufacture 99, and releasing the loaded trays to the conveyance system 180** while standing in an upright position and requiring little to no body movement other than lower arm and hand movement.

In addition to the construction and placement of the loading and unloading stations and conveyance system, in embodiment, the trays 200 are also designed with particular attention to operator ergonomics. As best seen in FIGS. 2A, 2B, 2C and 2E, in an embodiment, a slide rail 221 is configured along at least the front edge of the frame 220. The slide rail 221 is preferably manufactured using a low-friction material such as hard plastic which facilitates a sliding movement along the rails 182 of the conveyance system 180 when in the loading and unloading areas of the system 180. The front edge of the frame 220 may be identifiable as the side of the frame, when the frame is oriented horizontally, that is situated in front along the forward direction of transport of the conveyance system, as illustrated in FIG. 2D. As also illustrated in FIGS. 2B and 2D, the slide rail 221 may be configured with a concave cavity 222 to provide a gripping hold for an operator's fingers. The front of the frame 220 may also include a handle 280 to allow the operator to grasp the edge of the tray nearest the operator and to flip it from the vertical position to the horizontal position, or from the horizontal position to the vertical position (see FIG. 2D) with one hand and with one simple hand movement.

As best seen in FIGS. 2C, 2E, 4A, 4B and 6), when the trays 200 are stored in the tray rack 134, they are placed vertically with the slide rail 221 engaging the floor of the tray rack lane(s) 135 in which they are inserted. The slide rail 221 protects the side of the frame 220 when it is stored in the vertical orientation in the tray rack 134. In an embodiment, the slide rail 221 is made of a hard plastic with a low friction factor that allows the trays to slide easily along the floor of the lanes 135 in the tray rack 134.

The Printing System

Pre-Treatment Station

For some types of articles of manufacture 99, it may be important to clean and/or pre-treat the articles before the actual printing. Referring back to FIGS. 1A and 1B, a preferred embodiment of the system 100 includes a cleaning and pre-treatment station 160. The conveyance system 180 is configured to transport trays 200 from the loading station 130 to the pretreatment station 160 prior to moving on to the printer system 170.

Figure 8B:
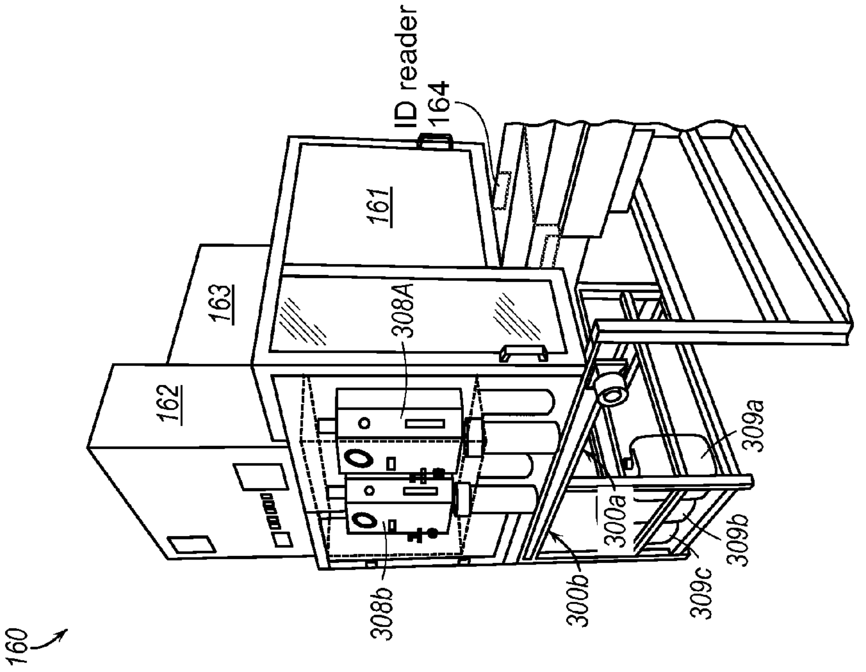
FIG. 8B is a perspective view of the pre-treatment system of FIG. 8A illustrating the entrance of the system.
Figure 8A:
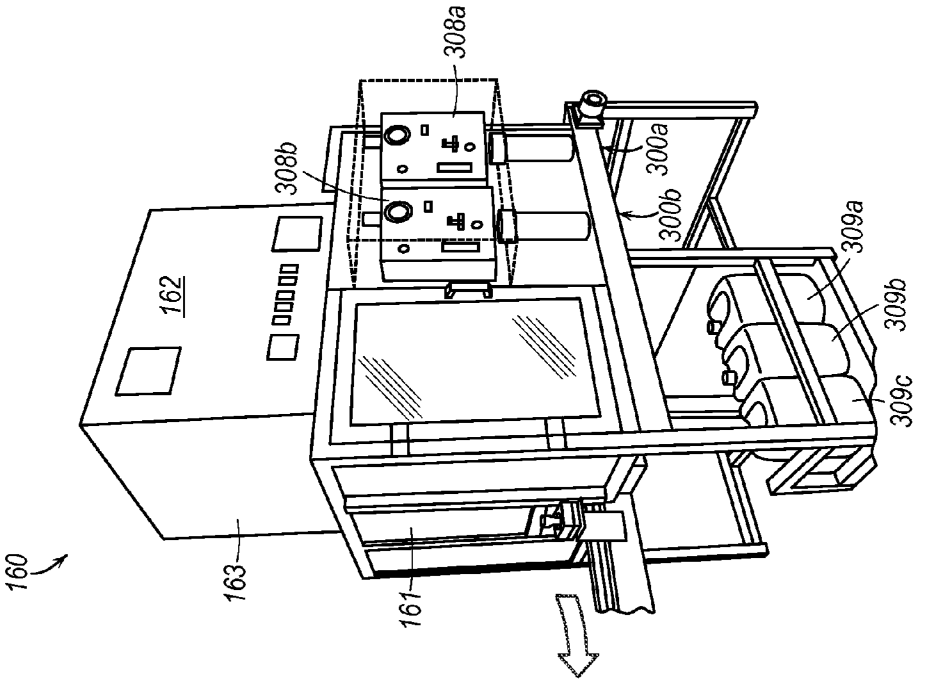
FIG. 8A is a side perspective view of a schematic representation of an exemplary embodiment of a pre-treatment system implemented in accordance with the invention.

As best seen in FIGS. 8A and 8B, the pre-treatment station 160 includes a framed housing 161 which encloses and/or houses the pre-treatment and cleaning components required for pre-treating and cleaning the print surfaces of the articles of manufacture 99 on trays 200 as the trays 200 pass through the system 160. In the illustrated embodiment, the two different process fluids (e.g., the wetting agent and the cleaning solution) are supplied from respective canisters **309*a*, 309*b* situated under the station's housing. A third canister 309 *c* may be used to collect excess process fluid that accumulates inside the station 160. Electronic detectors continuously check the level of fluid inside the three canisters. An electrical control cabinet 162 housing the pre-treatment station electronics, and an exhaust air pump/filter 163** may be situated at the top section of the housing.

In an embodiment, the pre-treatment station 160 is situated before the entrance to the printer system 170. The main conveyor belt 180 of the conveyance system 180 passes through the pre-treatment station 160. However, since the main conveyor speed may be higher than that needed to ensure effective pre-treatment of the print surfaces, the pre-treatment station 160 may be configured with a secondary slower-speed slide-belt system which engages the trays 200 as they pass through the station 160 to slow down the trays as they pass therethrough for increased pre-treatment and cleaning effectiveness. In such embodiment, the main conveyor 181 continues to run but slides under the trays 200 instead of carrying them.

In an embodiment, the pre-treatment station 160 applies a two-step treatment process. The first step is the application of a wetting agent which is used to prevent or reduce reticulation of the ink when applied to the surfaces of the articles of manufacture. Ink reticulation can occur when the surface tension of the ink is higher than the surface tension of the material on which it is deposited, and thus the ink droplets retain their surface tension and thus do not fully spread out. Under a microscope, reticulated ink may appear as a mosaic of similar size irregular polygonal shapes, and veins or cracks in the printed image may be visible to the naked eye.

A wetting agent may be applied to the print surface of the articles of manufacture. Wetting agents operate to change the properties of the print surface to make it more wettable by increasing the surface energy of the material on which the ink is to be applied to a level at or higher than the surface tension of the ink, triggering the flattening out of the ink droplets and the tendency of the ink to more uniformly spread out and stick to the print surface of the article of manufacture. The type of wetting agent that is effective for a given type of material generally varies depending on the chemical properties of both the ink and the print surface material of the article of manufacture on which the ink is to be deposited. Although the pre-treatment station 160 is shown with one wetting agent applicator, the pre-treatment station 160 may alternatively be implemented with multiple different wetting agent applicators, each for applying a different type of wetting agent on different types of articles of manufacture with different surface material composition.

The second step of the pre-treatment process is the cleaning process for smoothing out the wetted print surface and to reduce the surface complexity of the print surface for achieving improved print quality. In one embodiment, the cleaning agent is a diluted isopropyl alcohol (IPA) solution.

In an embodiment, the pre-treatment station 160 includes an identical pair of motorized sword brushes applying two different treatment fluids. The first brush unit is the pre-treatment brush which is used to apply the surface pre-treatment fluid or wetting agent. The second brush unit is the cleaning brush which may apply a cleaning solution and brush off or remove excess pre-treatment fluid to perform a final cleaning/de-greasing of the surface. A fluid regulator and filter unit 308*a*, 308*b* for each brush is situated outside the station's housing.

Figure 8C:
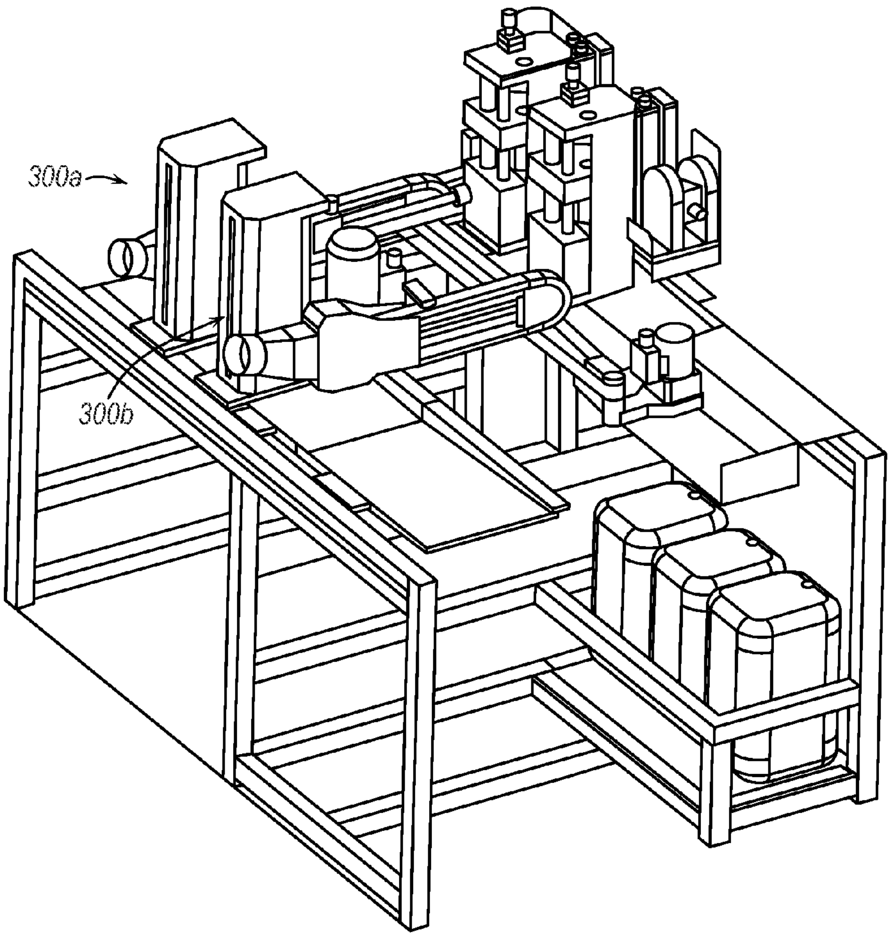
FIG. 8C is a perspective view of the pre-treatment system of FIG. 8A taken from the rear and exit of the system with the housing and conveyor removed.
Figure 8D:
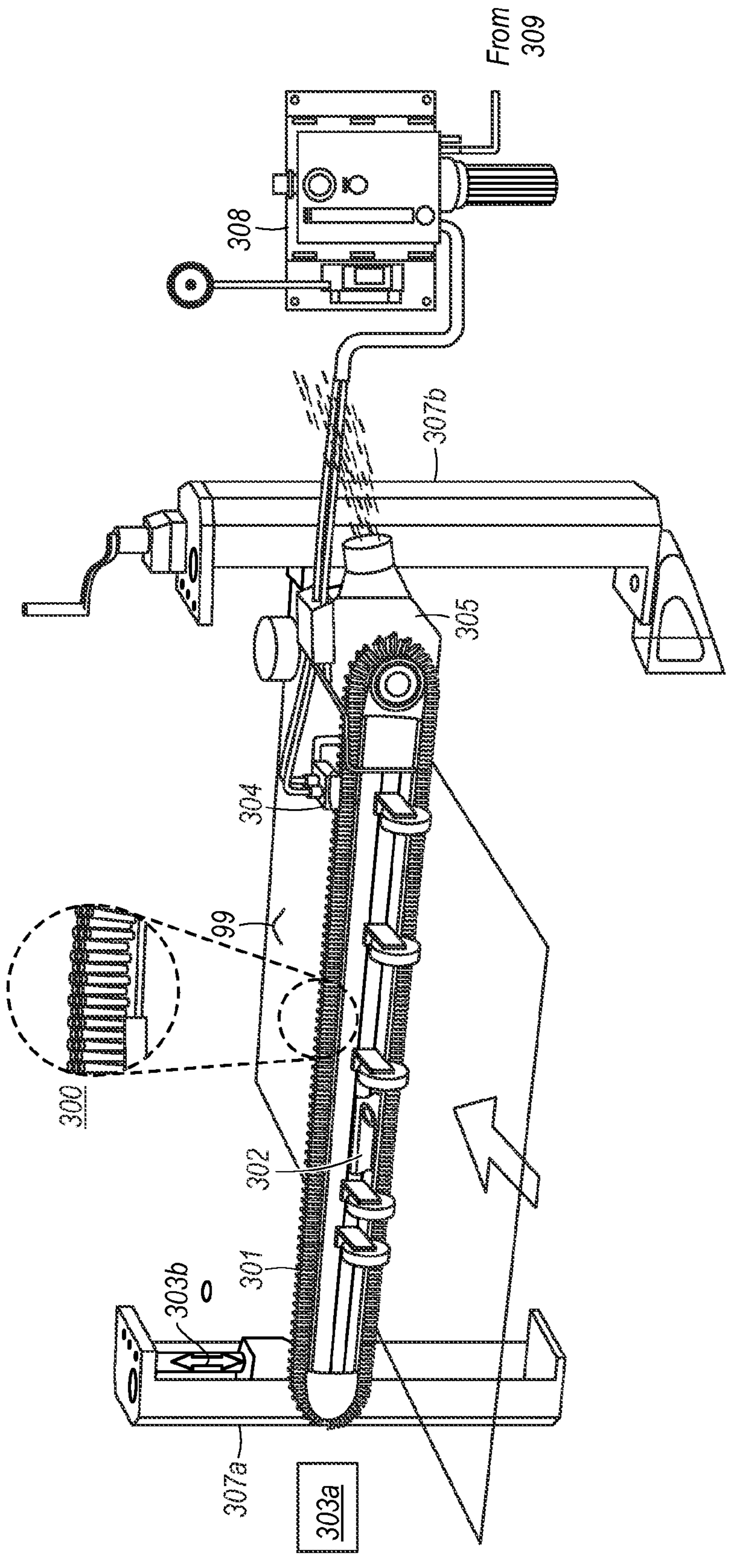
FIG. 8D is a view of a schematic representation of one of the brush units in the pre-treatment system of FIG. 8A.

In the embodiment shown herein, and as best seen in FIG. 8C, the pre-treatment fluid and the cleaning fluid are applied in successive stages by two respective identical brush units 300*a*, 300*b* contained within the pre-treatment station 160, one of which is diagrammed in FIG. 8D at 300. In an exemplary embodiment, and as best viewed in FIGS. 8C and 8D, the brush units are implemented using, for example, a Model KSB111 combination sword brush unit, manufactured by Wandres. A continuously rotating brush belt 301 is height adjusted on a pair of adjustment frames 307*a*, 307*b* to touch the target print surfaces of the articles of manufacture 99 with the correct contact pressure as they pass under the belt 301. The rotating brush 301 may be backed by an inflated cushion 302 (i.e., a pressure buffer) which regulates the contact pressure between the brush 301 and the print surface of the articles of manufacture 99. An integrated spray unit 304 continuously moistens the brush 301 with the process fluid. A suction unit 305 is also attached downstream from the brush 301 to collect particles and keep the brush itself clean.

As described earlier, in an embodiment, all trays 200 are designed to align the target print surface of the various types of articles of manufacture 99 on the trays 200 at an equal (and predetermined) height. In an alternative embodiment, the target print surfaces of the articles of manufacture 99 may not be predetermined, and may in practice vary depending on the type of article of manufacture. In such embodiment, the height of the conveyance may be adjusted within the printing system 150, such that the target print surfaces are positioned at a predetermined distance from the various processing components (such as, by way of example and not limitation, the pre-treatment system brushes, the print head nozzles, the curing lamps, etc.). The height adjustment can be determined using the principles and system described hereinafter with respect to the height adjustment system 400 in the printer system 170, and as described in connection with FIGS. 10A and 10B.

In an embodiment, the pre-treatment station 160 includes an identifier reader 164 which reads the identifier 230 of the tray to determine the type of article of manufacture 99 carried by the tray 200. A programmable logic controller PLC 303*a* controls a 2-level pneumatic height adjuster 303*b* to selectively apply or skip the brush treatment depending on the type of article of manufacture on the tray. The pre-treatment station 160 is depicted in the exemplary embodiment as having a single wetting agent application system 300*a* and a single cleaning solution application system 300*b*. In alternative embodiments, the pre-treatment station 160 may implement any number of different wetting agent application systems and/or cleaning agent application systems. The type of wetting agent and/or cleaning agent(s) to apply can be programmed and associated to a particular print job by including instructions or process identifications in the information associated with the tray identifier. When the tray 200 enters the pre-treatment station 160, a tray identifier reader may read the tray identifier, look up the information associated with the tray identifier, and determine whether and which pre-treatment agents and/or cleaning agents to apply to the print surfaces of the articles of manufacture on the particular tray 200.

Printer System

Figure 9A:
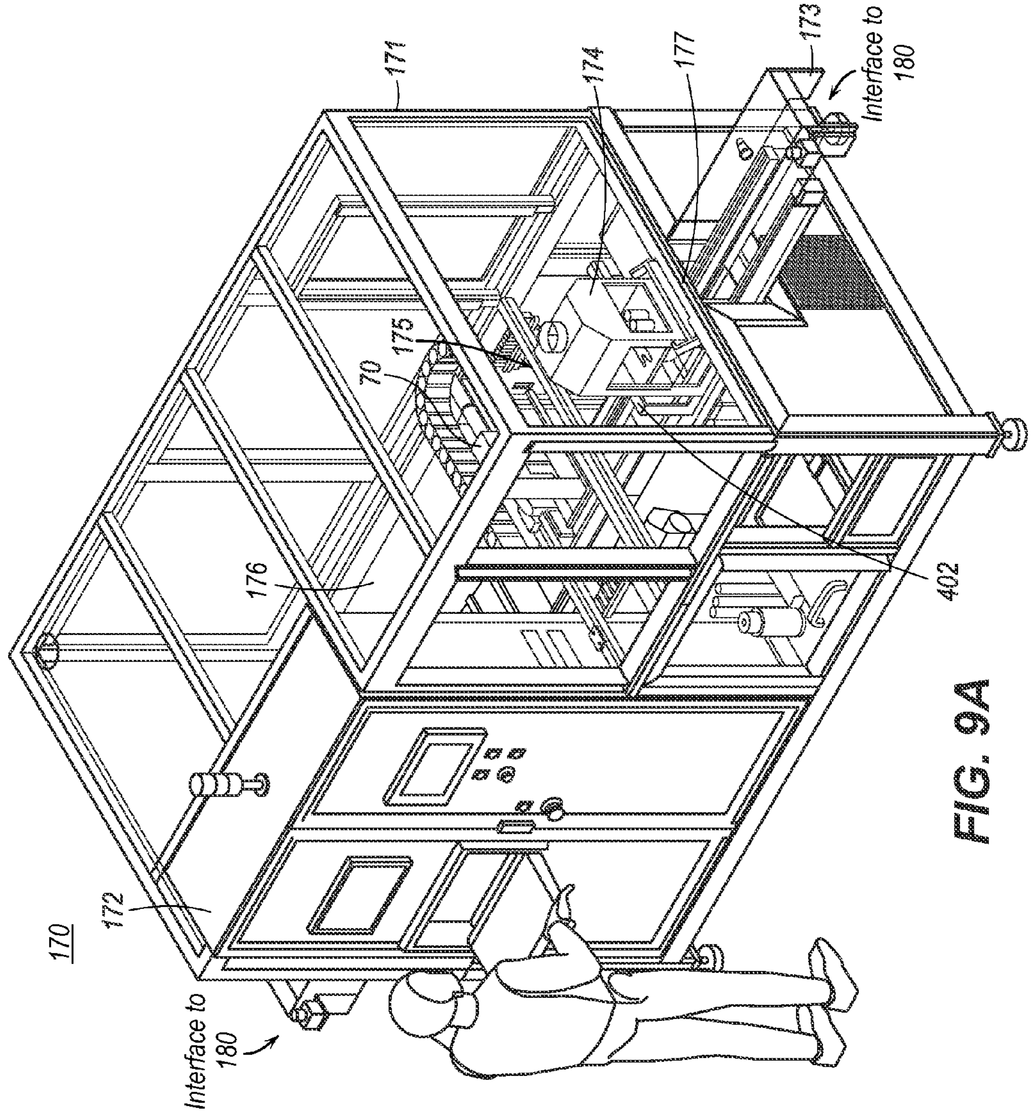
FIG. 9A is a top perspective view of a schematic representation of an exemplary embodiment of a printer system implemented in accordance with the invention.
Figure 9B:
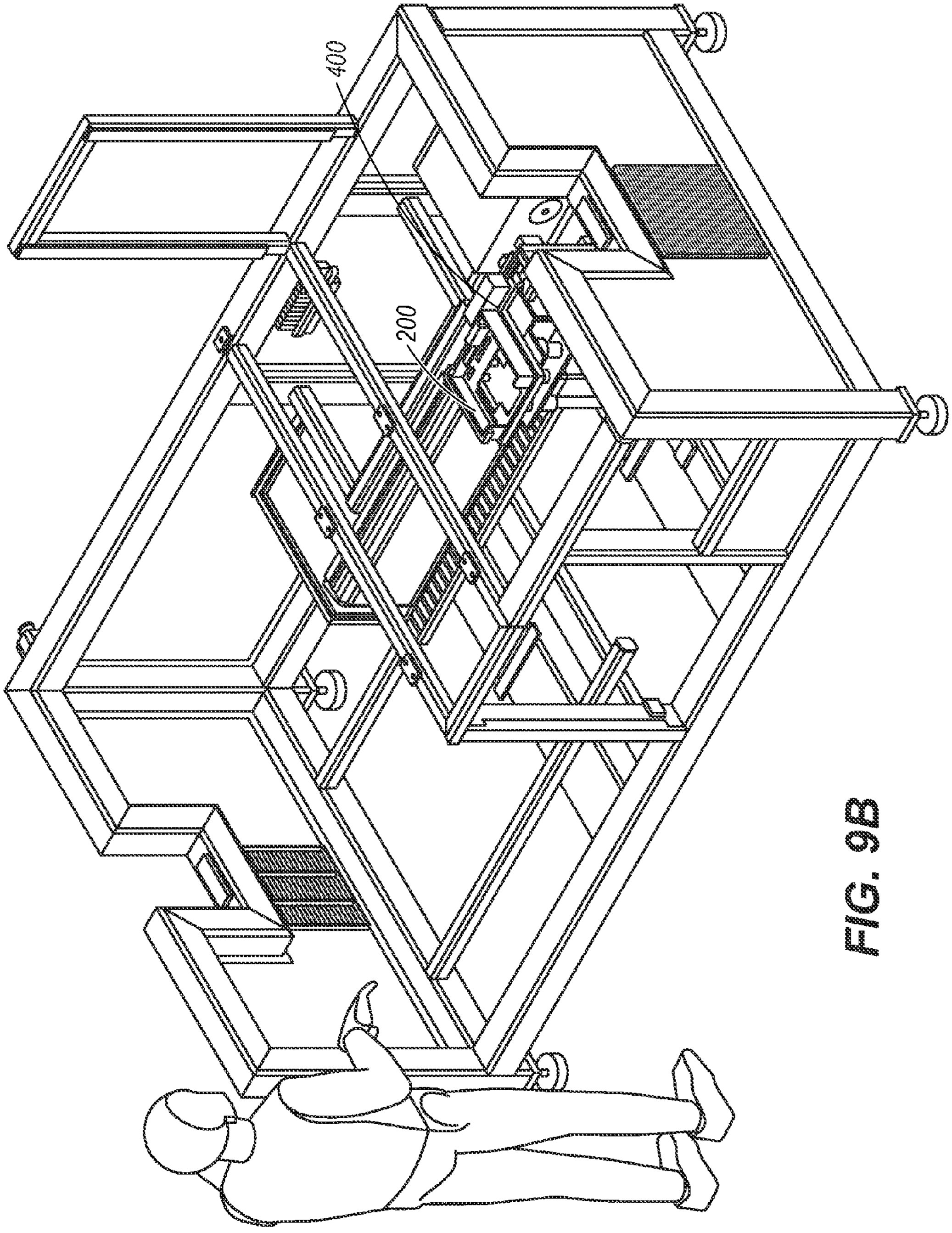
FIG. 9B is a top perspective view of the printer system of FIG. 9A with the upper framing and housing removed.

In an embodiment, as best shown in FIGS. 9A and 9B, the printer system 170 is designed to physically interface with the conveyance system 180 and to communicate with the system controller 105 and/or the production server 101 (see FIGS. 1A and 1B). The printer system 170 is preferably mounted within a frame 171, preferably enclosed for purposes of safety and cleanliness. In an embodiment, the frame 171 includes an inner frame on which the printer itself is mounted, and a guard frame which acts as a cover for the entire system 170. The inner frame is preferably made from mild steel box section for rigidity which is very important for maintaining a crisp printed image. The guard frame is preferably made from aluminium extrusion in-filled with clear polycarbonate panels. The guards covering the in-feed and out-feed conveyor sections are also made from the same fabricated polycarbonate sheet.

The trays 200 enter the printer system 170 immediately after exiting the pre-treatment station 160. In an embodiment, the trays 200 are engaged with a precision linear motion system 400 for printing.

The printer system 170 may include an ionization unit 174 which generates pressurized ionized air aimed at the print surfaces for removing any static charge, both positive and negative, from the print surfaces of the articles of manufacture on the tray.

The printer system 170 may further include a plasma jet treatment system 175 which operates to roughen the print surfaces of the articles of manufacture 99 on the tray 200 in order to increase surface tension to achieve better wetting. The plasma jet treatment is used to change the surface energy of the articles of manufacture. In an embodiment, the ink used is UV ink, which has higher viscosity than water-based ink. The surface energy is measured in Dynes and to help the ink adhere to the product, the surface energy needs to be increased to approximately 20 Dynes greater than that of the UV ink. In an embodiment, the plasma jet treatment system 175 includes one or more plasma nozzles set at pre-determined heights above the print surface of the articles of manufacture. Depending on the type of article of manufacture to be treated, the height of the plasma nozzles may be automatically adjusted.

In an embodiment, the printer system 170 includes one or more inkjet printer head(s) 70 designed to apply ink colors Cyan, Magenta, Yellow and Black (CMYK). In a particular embodiment, the print width is up to 72 mm. The printheads 70 are affixed to corresponding printhead assemblies, which include a head mounting plate with ink nozzles, ink tanks, head drive control circuits, and an outer housing.

In an embodiment, the printer system 170 includes a sensor 402 which senses a parameter from which the height of the printing surface of the articles of manufacture 99 on the tray 200 within the printer system 150 can be determined. Thus, the relative distance between the nozzles 72 of the print head 70 and the printing surface of the articles of manufacture in the tray can be determined. In an embodiment, the sensor 402 is a laser sensor that is mounted in a fixed position on the printer frame 171 above the conveyor 181 at the location that the tray 200 enters the printer system 170. The sensor 402 measures the distance between the sensor head and the print surface of the articles of manufacture 99 as they pass by a fixed location on the conveyor 181. The laser sensor measurement is used as input to a tray height adjustment mechanism 403 which adjusts the vertical position of the tray 200 from its unadjusted vertical position as delivered by the conveyance system 180 to a height-adjusted position during the actual printing process by the print head(s) 70. A controller receives and translates the laser signal from the sensor 402 into parameter representative of an unadjusted vertical position of the print surface of the articles of manufacture 99 on the tray 200, and determines a tray height adjustment parameter which may be used to signal a tray lift controller 404 to adjust the vertical position of the tray lift 403 so as to position the print surfaces of the articles of manufacture 99 to a vertical height that is within a specified distance (with a range of tolerance) of the print head nozzles 72 when the tray 200 passes beneath the print head(s) 70. Based on the laser sensor measurement, the height of the printing surface of the articles of manufacture is used to adjust to the optimal printing distance. If an article of manufacture 99 is not correctly placed on the tray 200, the tray 200 can be rejected without print. Otherwise, the articles of manufacture 99 on the tray 200 are printed.

Figure 10A:
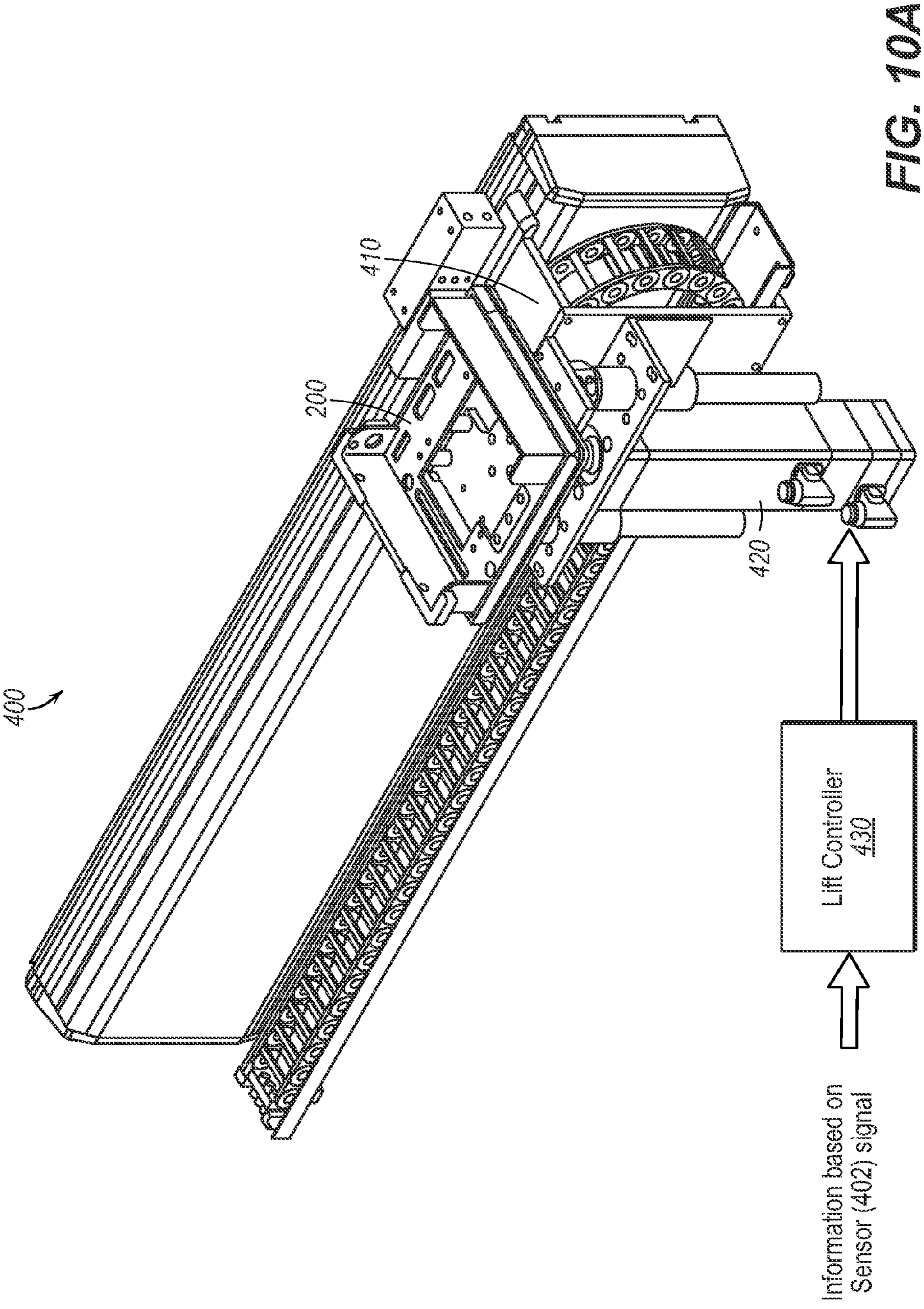
FIG. 10A is a view of a schematic representation of the linear motion system within the printing system of FIGS. 9A and 9B with a tray engaged thereon.
Figure 10B:
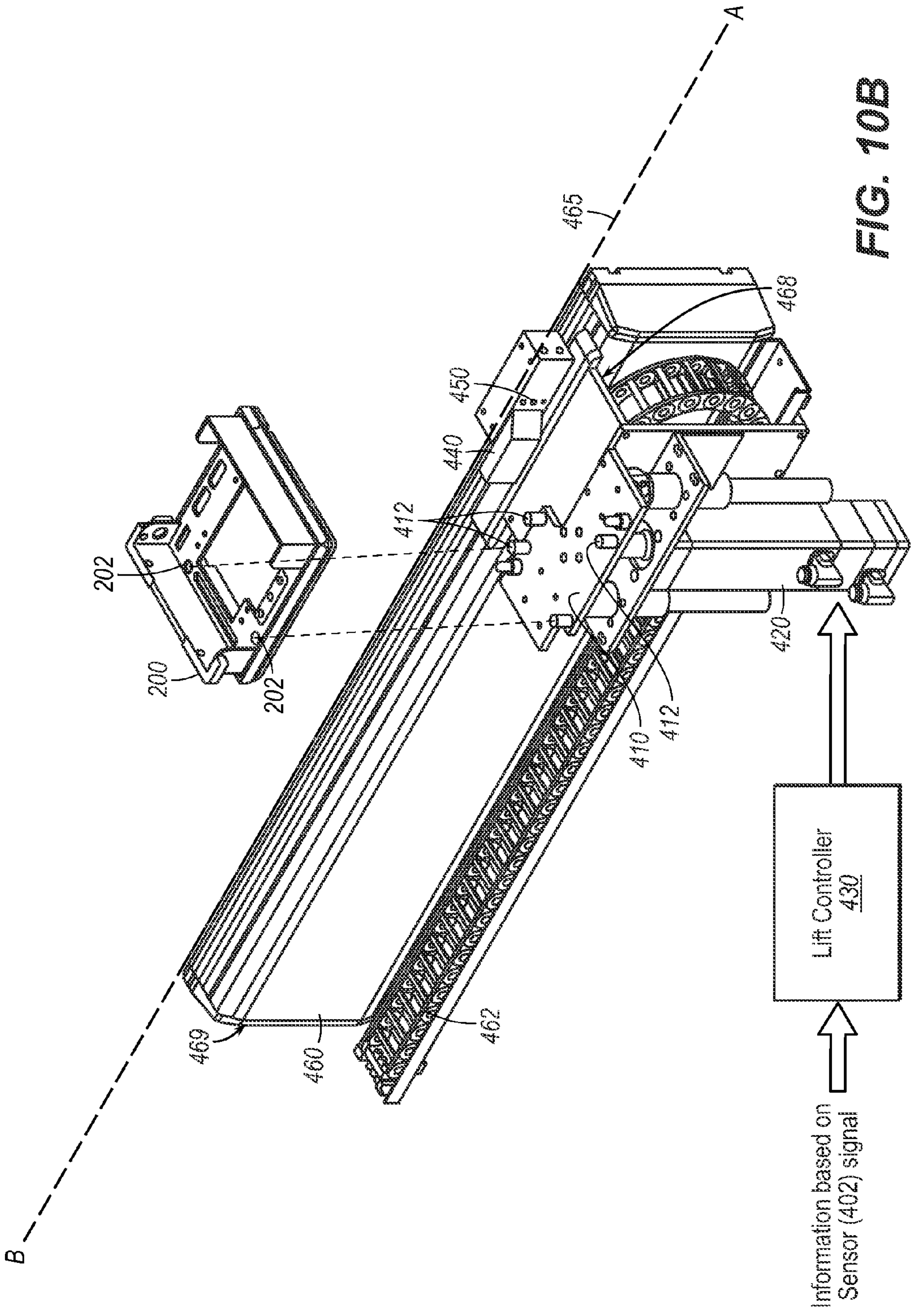
FIG. 10B is a view of the linear motion system of FIG. 10B without the tray.

FIGS. 10A and 10B illustrate an exemplary linear motion system 400. The linear motion system includes an engagement plate 410 configured to engage a tray 200 when the tray enters the printer system 170 by delivery of the main conveyance system 180. The engagement plate 410 is slidingly mounted on, or otherwise slidingly attached to, a linear motion transport rail 460. A driving mechanism 462 (directly or indirectly) engages the engagement plate 410 and is configured to transport the engagement plate 410 along a horizontal plane 465 between a pick-up position 468 at one end A of the rail 460 and a release position 469 at the opposite end B of the rail 460. In an embodiment, the driver 462 includes a conveyor chain driven by a motor. At the pick-up position 468, the engagement plate is configured to engage a tray 200 delivered by the conveyance system 180, and the driver 462 is configured to transport the tray 200 in a forward direction along a fixed linear path 465 defined by the rail 460 to the release position 469, where the tray 200 is released back to the main conveyance system 180. After delivering the tray 200 back to the main conveyance system 180, the engagement plate 410 is driven, by the driver 462, back along the linear path 465 to the pick-up position 465 to be ready to pick up another tray 200. The driver 462 thus drives in a forward direction and a reverse direction.

The engagement plate 410 includes an engagement mechanism for fixing the tray 200 in static position with respect to the plate 410. In an embodiment, the engagement mechanism comprises one or more positioning pins 412. The tray 200 includes positioning sockets or holes 202 in the base plate 210 of the tray 200. When the main conveyor 181 delivers the tray 200 to the printer system 170, the tray is automatically transported to and stopped at a position over the engagement plate 410 such that the engagement pins 412 align with the positioning sockets or holes 202 in the bottom of the base plate 210 of the tray. In an embodiment, a tray sensor 450 is mounted on the rail 460 (or alternatively a position on the frame 171 or other mounting substrate within the printing system 150). The tray sensor 450 detects the presence of a tray 200 at the pick-up position 468. The tray is stopped in the pick-up position by a stopper 440, preferably mounted along the rail 460. The stopper 460 stops the tray in a position of alignment such that the positioning pins 412 of the engagement plate 410 align with the sockets/holes 202 of the base plate 210 of the stopped tray 200. A lift controller 430 monitors the sensor signal to perperly control the timing of a lift 420. The lift 420 operates to lift the engagement plate 410 to simultaneously engage the bottom of the base plate 210 of the tray 200 and center the engagement pins 412 in the positioning sockets/holes of the base plate 210 of the tray, thereby fixing the tray in place on the engagement tray 410.

The lift controller 430 further receives information, directly or indirectly through one or more additional controllers and transmitters and/or receivers, from the height adjustment sensor 402 of the printer system 170. The received sensor information is used by the lift controller 430 to control the lift 420 to set the height of the engagement plate 410 to a vertical position such that the print surface(s) of the article(s) of manufacture on the engaged tray 200 within a predetermined distance (plus or minus a predetermined tolerance) of the print head nozzles of the print heads 70 of the printer system 150.

Figure 11:
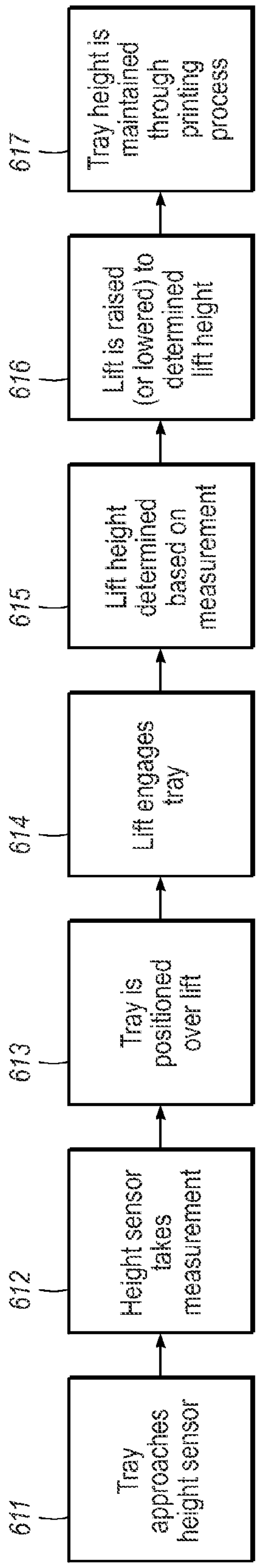
FIG. 11 is a flowchart illustrating an exemplary method for adjusting the height of the tray for printing or other processing.

FIG. 11 depicts an exemplary embodiment of a method for adjusting the height of a tray to align the print surfaces of the article of manufacture to be printed to with a pre-determined distance of the print head nozzles when the tray 200 on which the articles are carried is printed. As illustrated, a tray approaches the height sensor 402 (step 611), where the height sensor takes a measurement (step 612). The tray is conveyed such that it is stopped in a pre-determined position ready to be lifted (step 613). The lift engages the tray (step 614). The lift height is determined based on the height sensor measurement (step 615). The lift is then controlled to set the height of the lift to the determined lift height (step 616). The tray is then conveyed for printing, maintaining the lifted height during the printing process (step 617), and in particular as the print surface(s) of the articles of manufacture are printed by the print head(s) 70.

Returning to FIGS. 9A, 9B, 10A and 10B, when an engaged tray 200 is to be released from the engagement plate 410, the lift 420 is instructed to lower sufficiently to disengage the positioning pins 412 from the sockets/holes of the base plate 210 of the tray 200. The main conveyance system 180 may therefore engage the released tray 200 and transport it out of the printing system 170.

Referring again to FIG. 9A, the printer system 170 may also include a curing unit 176, such as an ultra-violet (UV) curing system. The trays 200 pass into the UV curing unit 176 immediately upon passing under the printhead(s) 70, and then out of the print system 170. At the exit, the tray 200 is transferred back to the main conveyor 181 and routed by the conveyance system 180 to the unloading station 140.

Preferably, the printing system 150 includes one or more tray identifier reader(s) 177 positioned and configured to read the tray identifier 230 on each tray 200 as it enters the printing system 150. In an embodiment, the tray identifier 230 is an RFID tag and the tray identifier reader 177 is an RFID read head. The signal from the RFID reader 177 is sent to the system controller 105 or the production server 101, or an alternative remote control system, which translates the signal into a corresponding tray identifier from which the print job(s) currently associated with the tray can be identified and used to derive information needed to process the articles of manufacture at each station. For example, in an embodiment, information which can be derived from the tray identifier 230 includes the type of articles of manufacture 99 present on the tray. The information about the type of article of manufacture 99 can be used to selectively turn on or off one or more of the following functions: application of the wetting agent in the pre-treatment station 160, application of the cleaning solution in the pre-treatment station 160, activation of the cleaning brush in the pre-treatment station 160, activation of ionization in the printing system 170, application of plasma treatment in the printing system 170, printing or not printing by the print heads 70, and curing or not curing by the curing unit 176. In alternative embodiments, the printer system 150 is a multi-functional unit that is configured not only to print articles of manufacture 99, but also to engrave, etch, embroider, label, stamping, affix, or otherwise embed or imprint content information on an article of manufacture 99 which is conveyed by a tray passing therethrough. Each tray passing into the system can therefore be identified using the tray identifier, and one or more of the printing, engraving, etching, embroidering, labeling, stamping, affixing or other functionally embedding functions can be enabled to print, engrave, etch, embroider, label, affix, or otherwise embed the content contained in the print job (or "job", generally) onto the articles of manufacture 99. Once a tray has been used to process a job and the job is complete and articles of manufacture unloaded, the tray identifier 230 can be disassociated from the completed job. The tray and its identifier can then be reused and associated with a new and different job. The tray inlay 210 may even be switched out with an inlay 210 configured to hold a different type or types of articles of manufacture than the replaced inlay.

System Control

The printing system 150 includes system controller 105. In an embodiment, the system controller comprises a computing environment 500, illustrated in FIG. 5, for controlling and managing the operations of the printing system. The computing environment 500 includes a general-purpose computing device in the form of a computer 510, which may comprise any electronic device with computing and/or processing capabilities. The components of computer 510 may include, but are not limited to, one or more processors or processing units 520, a system memory 530, and a system bus 521 that couples various system components including processing unit(s) 520 to system memory 530.

System bus 521 represents one or more of any of several types of bus structures, including a memory bus or memory controller, a peripheral bus, an accelerated graphics port, and a processor or local bus using any of a variety of bus architectures. By way of example, such architectures may include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

Computer 510 typically includes a variety of electronically-accessible media. Such media may be any available media that is accessible by computer 510 or another electronic device, and it includes both volatile and non-volatile media, removable and non-removable media, and storage and transmission media.

System memory 530 includes electronically-accessible media in the form of volatile memory, such as random access memory (RAM) 532, and/or non-volatile memory, such as read only memory (ROM) 531. A basic input/output system (BIOS) 533, containing the basic routines that help to transfer information between elements within computer 510, such as during start-up, is stored in ROM 531. RAM 532 typically contains data and/or program modules/instructions that are immediately accessible to and/or being presently operated on by processing unit(s) 510.

Figure 5:
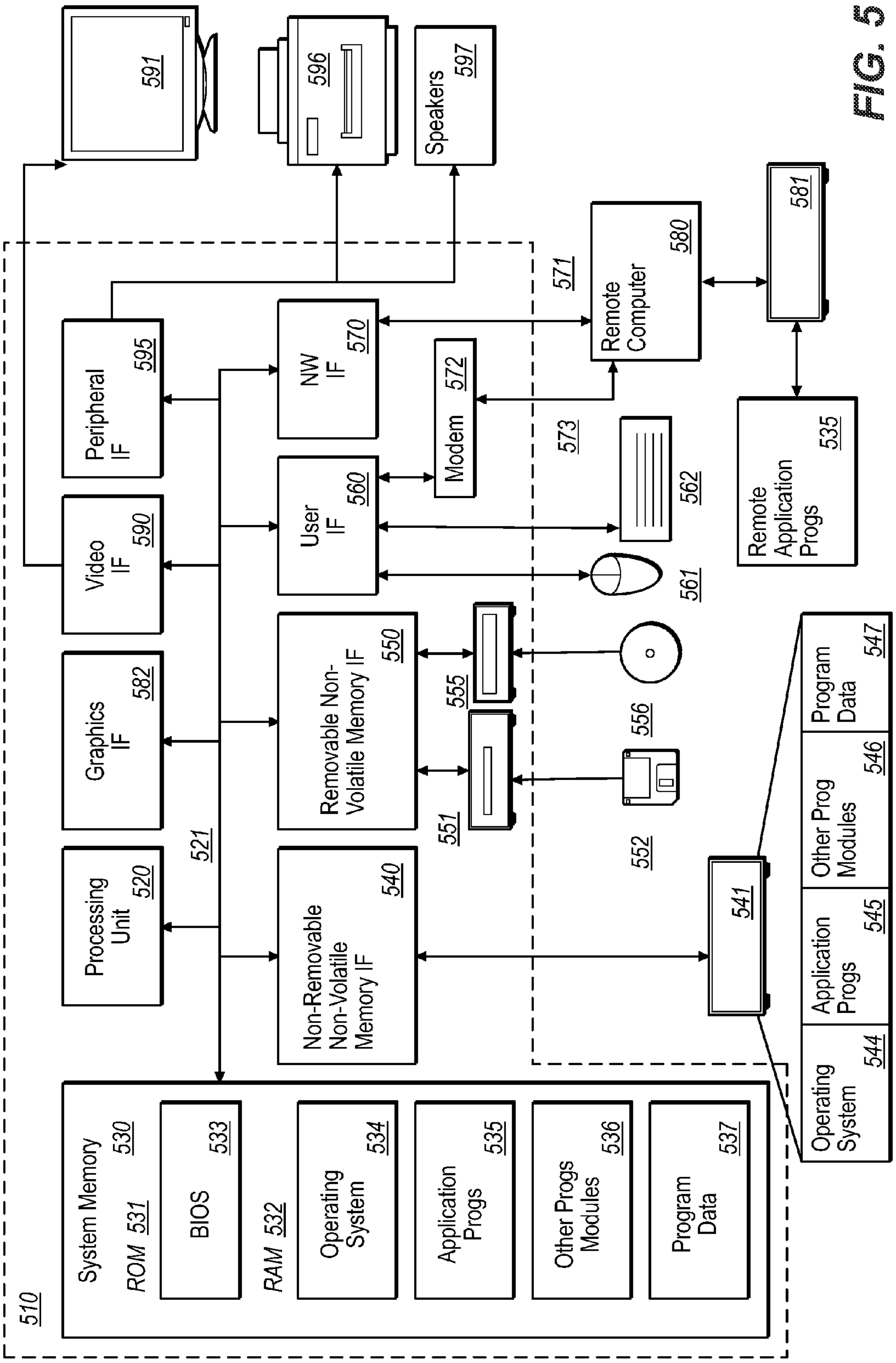
FIG. 5 is a block diagram representation of a computer system which may be used to implement one or more of the conveyance printing system components, such as but not limited to the system controller.

Computer 510 may also include other removable/non-removable and/or volatile/non-volatile electronic storage media. By way of example, FIG. 5 illustrates a hard disk drive 541 for reading from and writing to a (typically) non-removable, non-volatile magnetic media (not separately shown); a magnetic disk drive 551 for reading from and writing to a (typically) removable, non-volatile magnetic disk 552 (e.g., a "floppy disk"); and an optical disk drive 555 for reading from and/or writing to a (typically) removable, non-volatile optical disk 556 such as a CD-ROM, DVD-ROM, or other optical media. Hard disk drive 541, magnetic disk drive 551, and optical disk drive 555 are each connected to system bus 521 by one or more data media interfaces 540, 550. Alternatively, hard disk drive 541, magnetic disk drive 551, and optical disk drive 555 may be connected to system bus 521 by one or more other separate or combined interfaces (not shown).

The disk drives and their associated electronically-accessible media provide non-volatile storage of electronically-executable instructions, such as data structures, program modules, and other data for computer 510. Although exemplary computer 510 illustrates a hard disk 541, a removable magnetic disk 552, and a removable optical disk 556, it is to be appreciated that other types of electronically-accessible media may store instructions that are accessible by an electronic device, such as magnetic cassettes or other magnetic storage devices, flash memory cards, CD-ROM, digital versatile disks (DVD) or other optical storage, random access memories (RAM), read only memories (ROM), electrically erasable programmable read-only memories (EEPROM), and so forth. In other words, any electronically-accessible media may be utilized to realize the storage media of the exemplary computing system and environment 500.

Any number of program modules (or other units or sets of instructions) may be stored on hard disk 541, magnetic disk 552, optical disk 556, ROM 531, and/or RAM 532, including by way of example, an operating system 544, one or more application programs 545, other program modules 546, and program data 547. By way of example only, operating system 544 may comprise file system component(s), application programs 545 may comprise program and/or applications, and program data 547 may comprise files and/or the content thereof.

A user may enter commands and information into computer 510 via input devices such as a keyboard 562 and a pointing device 561 (e.g., a "mouse"). Other input devices (not shown specifically) may include a microphone, joystick, satellite dish, serial port, scanner, and/or the like. These and other input devices are connected to processing unit(s) 520 via input/output interfaces 595 and 560 that are coupled to system bus 521. However, they may instead be connected by other interface and bus structures, such as a parallel port, a universal serial bus (USB) port, an IEEE 1394 interface, an IEEE 802.11 interface, and so forth.

A monitor 591 or other type of display device may also be connected to system bus 521 via an interface, such as a video adapter 590. In addition to monitor 591, other output peripheral devices may include components such as speakers (not shown) and a printer 596, which may be connected to computer 510 via network input/output interfaces 570.

Networked Environment

Computer 510 may operate in a networked environment using logical connections to one or more remote computers, such as a remote computing device 580. By way of example, remote computing device 580 may be a personal computer, a portable computer (e.g., laptop computer, tablet computer, PDA, mobile station, etc.), a server, a router, a network computer, a peer device, other common network node, or other computer type as listed above, and so forth. In a particular example, the remote computing device 580 may be the production server 101 shown in FIGS. 1A and 1B. Remote computing device 580 is illustrated as a computer that may include many or all of the elements and features described herein relative to computer 510. Logical connections between computer 510 and remote computer 580 may be implemented as any one or more of a local area network (LAN) 571, a general wide area network (WAN) 573, a wireless network, etc. Such networking environments are commonplace in offices, enterprise-wide computer networks, intranets, the Internet, fixed and mobile telephone networks, other wireless networks, and so forth.

When implemented in a LAN networking environment, computer 510 is connected to a local area network 571 via a network interface or adapter 570. When implemented in a WAN networking environment, computer 510 typically includes a modem 572 or other means for establishing communications over wide area network 573. Modem 572, which may be internal or external to computer 510, may be connected to system bus 521 via input/output interfaces 560 or any other appropriate mechanism(s). It is to be appreciated that the illustrated network connections are exemplary and that other means of establishing communication link(s) between computers 510 and 580 may be employed.

In a networked environment, such as that illustrated with computing environment 500, program modules or other instructions that are depicted relative to computer 510, or portions thereof, may be fully or partially stored in a remote memory storage device. By way of example, remote application programs 535 reside on a memory device 581 of remote computer 580. Also, for purposes of illustration, application programs 528 and other executable instructions such as operating system 527 are illustrated herein as discrete blocks, but it is recognized that such programs, components, and other instructions reside at various times in different storage components of computing device 510 (and/or remote computing device 580) and are executed by data processor(s) 504 of computer 510 (and/or those of remote computing device 580).

Overview of Workflow Operations

As discussed previously, each production loop operations area 120*a*, 120*b* includes at least one workstation which allows operators on each production loop to work independently yet share a single printing system 150. Each operations area 120*a*, 120*b* can be operated by one or more operators 2*a*, 2*b*, depending on the workload. In an embodiment, when two operators 2*a*, 2*b* are present on a production loop 110*a*, 110*b*, a first operator 2*a* handles the loading of trays 200 and the sort & pack operations where as a second operator 2*b* handles the unloading and bagging operations. Of course, it will be appreciated that the workload could be partitioned in various other ways, including through the use of additional or fewer operators, and/or through the automation of one or more of the loading and unloading functions.

The various types of unprinted articles in their original packaging (e.g. carton boxes) are stored in racks 132 and are placed by the loading operator 2*a* into trays 200 which hold the corresponding type of article of manufacture. Different types of trays 200, which are customized to carry a particular type of article of manufacture 99, are stored in tray racks 135. The green/yellow light Pick-to-Light system 190 visually guides the operator 2*a* to pick and place the correct articles 99 into the correct type of tray 200 and release it to the conveyor system 180 for further processing by the printing system 150.

Identifiers 230, such as RFID tags, embedded on or in the trays 200, are used to tag each tray with process information (e.g. name of the image file to be printed, process parameters, workstation number etc.). This assures that the right content is printed onto each article of manufacture. The trays 200 are automatically routed to the infeed of the printing system 150 by the main conveyor system 180.

In addition to the actual ink-jet printing process, the printing system 150 also preferably applies several pre-treatment and post-treatment processes to the articles of manufacture. The different processes, in preferred order of application, are as follows:

1. Pre-Treatment: Selected application of one or more wetting agents followed by selected cleaning.
2. Ionized Air Wash: Naturalizes the surface electric charge on the promo items
3. Plasma Jet: Increases the surface energy of the articles of manufacture to allow better wetting by the ink
4. Ink-jet: Actual printing with four color (CMYK) digital ink-jetting print head with adjustable printhead-to-substrate distance.
5. UV-Pinning: An initial curing (for example using an LED light source) to fix the ink onto the print surface of the articles of manufacture immediately after the printing.
6. Final UV-Curing: Final curing by a strong mercury arc-lamp UV source.

Depending on the type of article of manufacture 99 on the tray 200, as determined by the information associated with the identifier 230 on the tray 200, each available process (pre-treatment, ionization, plasma jet, printing, UV pinning, UV-curing) can be automatically level adjusted (e.g., to set the intensity, amount of treatment of fluid, processing time, etc.) or altogether skipped, based on the information associated with the tray identifier 230.

After the articles of manufacture 99 on the tray 200 have been fully processed (as determined from the information associated with the tray identifier 230), the tray 200 is routed back to the original operations area 120*a*, 120*b* for unloading. A scanner is used by the unloading operator 2*b* to identify each article 99 removed from the tray 200. The unloaded articles are then placed into the bagging machine and bagged into individual packages. The packages, or alternatively the individual articles themselves, are labeled for identification.

The bagged items are conveyed to the sort & pack table via a secondary ground conveyor system. They are sorted, packed and forwarded to the platform outbound logistics process of the plant.

Figure 12:
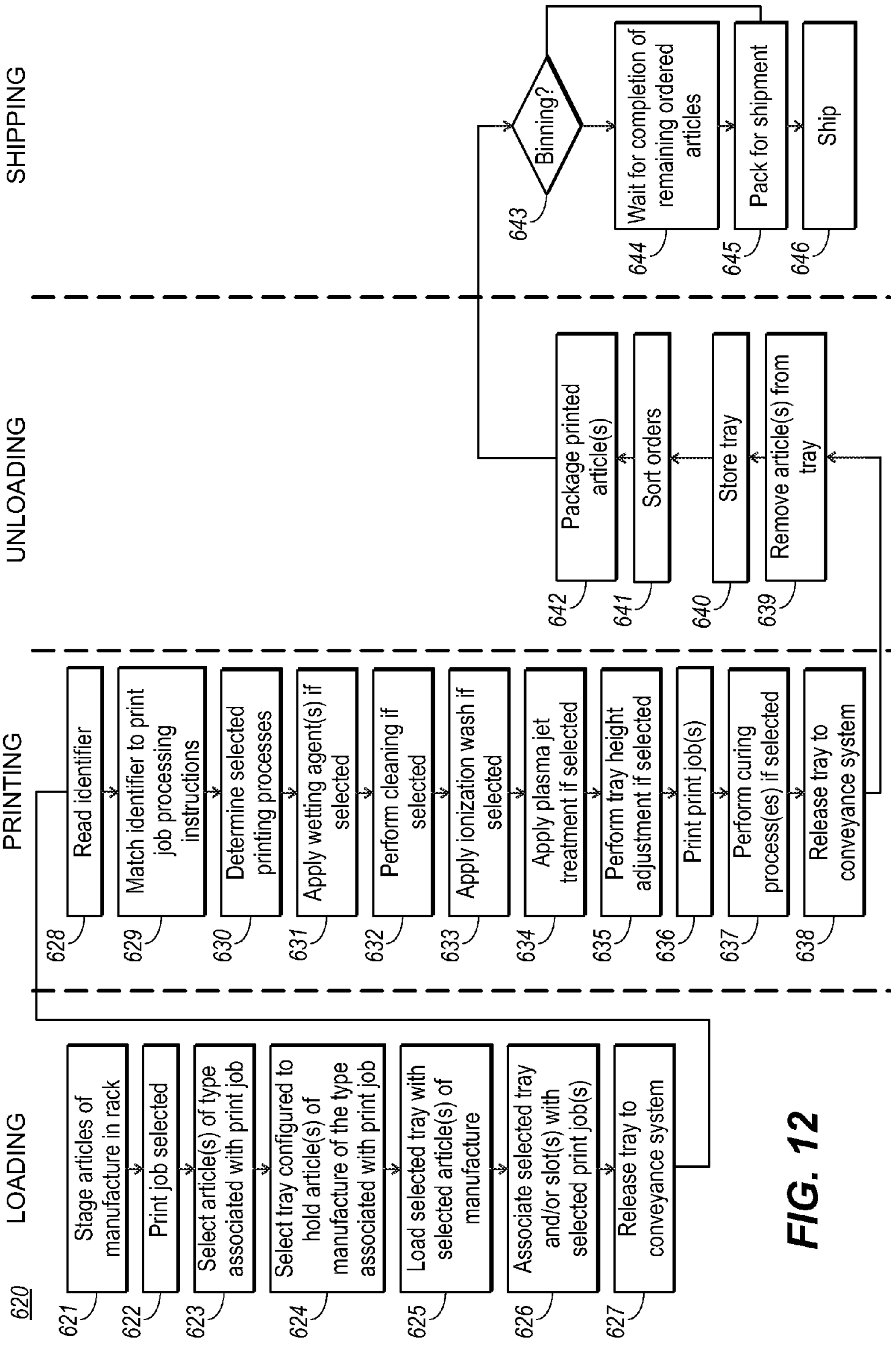
FIG. 12 is a flowchart illustrating the workflow operations of the conveyance printing system.

FIG. 12 is an operational flowchart illustrating an exemplary method 620 of operation of a printing system implemented in accordance with principles of the invention. As illustrated, material to be printed such as blank (as-yet unprinted) articles of manufacture are loaded into the materials staging rack (article of manufacture rack 131) for easy access by a loading operator (step 621). It will be appreciated that as used herein, the term "blank" article of manufacture refers merely to an article of manufacture which has at least one area intended to be printed on by the printing system and which has yet to be printed. An article of manufacture may, for example, have no printed material on it. Alternatively, an article of manufacture may include pre-printed material and may be submitted to the printing system for printing of additional material which is not yet printed thereon. In this case, the article of manufacture which still has one or more areas still intended to be printed would still, for purposes of this particular pass through the printing system, be considered a "blank" article of manufacture.

A print job is selected (step 622). In an embodiment, the print job is selected automatically by the production server 101 and communicated to the system controller 105, which signals the Pick-To-Light system 190 to indicate what type of tray to load. In an alternative embodiment, the operator selects a print job from a queue of pending print jobs. The print job may be an individual print job associated with a single article of manufacture to be printed, or may be an aggregated gang of individual print jobs (an "aggregate" print job) for trays containing multiple articles of manufacture to be sent through the printer simultaneously. Upon selection of a print job, the operator selects one or more articles of manufacture of the type associated with the selected print job (step 623) and a tray configured to hold articles of manufacture of the type associated with the print job (step 624). The operator then loads the selected tray with the selected articles of manufacture (step 625). The individual print job and/or the aggregate print job is associated to an identifier on the tray (for example, the tray identifier 230 and/or individual slot identifiers in the tray) from which the production server and/or other devices can extract the information necessary to identify and associate each printed item with the order information (such as customer information, shipping address, etc.). The identifier indicating the individual print job(s) and/or aggregate print job is attached to or embedded in the loaded tray. The tray 200 is then released to the conveyance system 180 for transport to the printing system 170.

The tray 200 is then conveyed by the conveyance system 180 to the entrance of the printing system 150. Prior to or upon entry into the printing system 150, a scanner reads the tray and/or slot identifier(s) from the tray 200 (step 628). The scanned identifier is matched to the print job to which the identifier is associated (step 629), from which a set of job processing instructions may be determined (step 630). The tray then passes through one or more of the print processing functions. For ease of explanation, the term "selectively applied" means a function referred to therewith is applied if the job processing instructions associated with the identifier of the tray indicate that the particular function should be applied, and is not applied if the job processing instructions indicate that the function should not be applied. Likewise, the term "selectively performed" means a function referred to therewith is performed if the job processing instructions associated with the identifier of the tray indicate that the particular function should be performed, and is not performed if the job processing instructions indicate that the function should not be performed.

In an exemplary embodiment, one or more wetting agent(s) are selectively applied (step 631), followed by a selectively performed cleaning process (step 632). An ionization wash may be selectively applied (step 633), as well as selective application of a plasma jet treatment (step 634). Further, the tray conveyance height may be selectively adjusted (step 635) prior to actual printing of the print job (step 636). Post-printing, the selective operations may include selectively performing one or more curing processes (step 637). It will be appreciated that all, fewer, or additional pre- and/or post-printing processes may be implemented and selectively applied using the selective indication in the job processing instructions associated with the tray identifier.

As described in connection with FIGS. 8A-8D, the system may include a pre-treatment system 160. For example, the pre-treatment system may include a wetting agent application and/or cleaning system. The pre-treatment system 160 may be integrated into the printing system or may be a separate system along the conveyance system and to and from or through which the conveyance system conveys a tray along the conveyance path. The tray enters the pre-treatment system, conveyed by the conveyance system, where the articles of manufacture are pre-treated. In an embodiment, a cleaning fluid is applied to the print surfaces of the articles of manufacture held on the tray which enters the pre-treatment system. The print surfaces may be brushed with the cleaning fluid and then the cleaning fluid may then be brushed, wiped, or otherwise removed from the print surface(s) of the articles of manufacture. In an embodiment, a wetting agent may be applied to the print surface(s) of the articles of manufacture to reduce ink reticulation and to encourage sticking of ink to the print surface(s) of the articles of manufacture. Whether and what type of cleaning fluid and/or wetting agent to apply will depend on the material and surface characteristics of the article of manufacture and is accordingly represented by way of the processing instructions associated with the identifier of the tray on which such articles are loaded.

As further described in connection with FIGS. 9A and 9B, upon exit of the pre-treatment system 160, if utilized, the tray 200 of pre-treated articles of manufacture is advanced to the printer system 170. In an embodiment, an identifier reader such as an RFID reader scans/reads the tray identifier, which is matched up by the system controller 105 and/or production server 101 to an associated print job including a print file to be printed onto the print area(s) of the articles of manufacture on the tray and preferably an associated set of print processing instructions. In an embodiment, the print file includes individual print content to be printed on each of the respective articles of manufacture loaded on the tray. Potentially, the individual print content to be printed onto each of the individual articles of manufacture may be different for each article of manufacture. In an embodiment, the print file associated with the tray is a single aggregate print file comprising the individual print content for each of the individual articles of manufacture on the tray. The printing system treats the aggregate print file as a single print job and prints the file as if it is printing a single article of manufacture.

As further described in connection with FIGS. 9A, 9B, 10A and 10B, in an embodiment, the printer system 170 includes a tray height adjustment system 400, including a tray height or distance sensor 402 and a tray height adjustment mechanism 410, 420, 430. In such an embodiment, upon or prior to entering the printer system 170, the height or distance sensor 402 detects the height or distance to the print surface(s) of the articles of manufacture loaded on the tray. The distance adjustment mechanism translates the sensed height/distance into an adjustment amount and selectively raises or lowers the tray to achieve the adjustment amount. Alternatively, the distance adjustment mechanism raises or lowers the printhead(s) to achieve the adjustment amount.

To print the file associated with the tray, the printer (optionally adjusting the tray height or print head position to achieve optimal print-surface-to-print head distance) prints the print file content onto the print surface(s) of the articles of manufacture. In an embodiment, the printer system 170 includes a curing system such as a dryer or ultraviolet light. Referring again to FIG. 12, upon exit from the printing system, the tray is conveyed to the unloading area, where the individual articles of manufacture are unloaded from the tray (step 639), identified (step 641), and packaged (step 642). The tray itself is stored for use for processing another print job (step 640).

In an embodiment, at the unloading station the identifier (e.g., RFID tag) on the tray 200 is read by a scanner as the tray enters the unloading area. The print job currently associated with the scanned RFID is retrieved by the server and the individual orders are identified by position in the tray and sorted by the operator (step 641). In an embodiment, the individual orders are designated by position and communicated to an operator via a display screen. Additionally, shipping and/or order labels are automatically generated from order information associated with the individual order derived from the aggregate print job identifier. The operator can positionally and visually identify the printed article of manufacture associated with each individual order and can package and apply the shipping/packaging label to each individual order.

Figure 13:
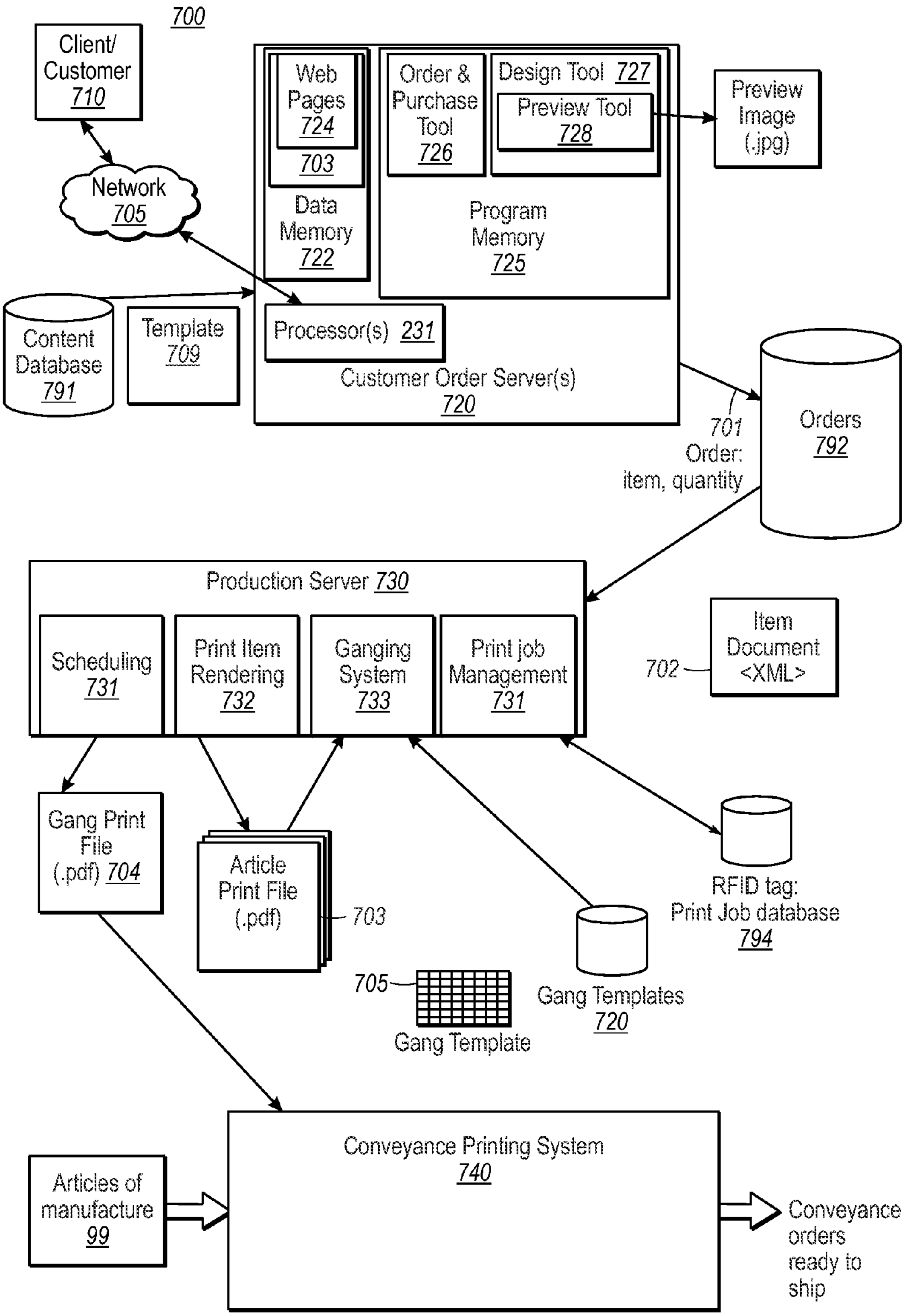
FIG. 13 is a block diagram illustrating a retail production system in which the conveyance printing system may operate.
Figures 14A, 14B, 14C, 14D:
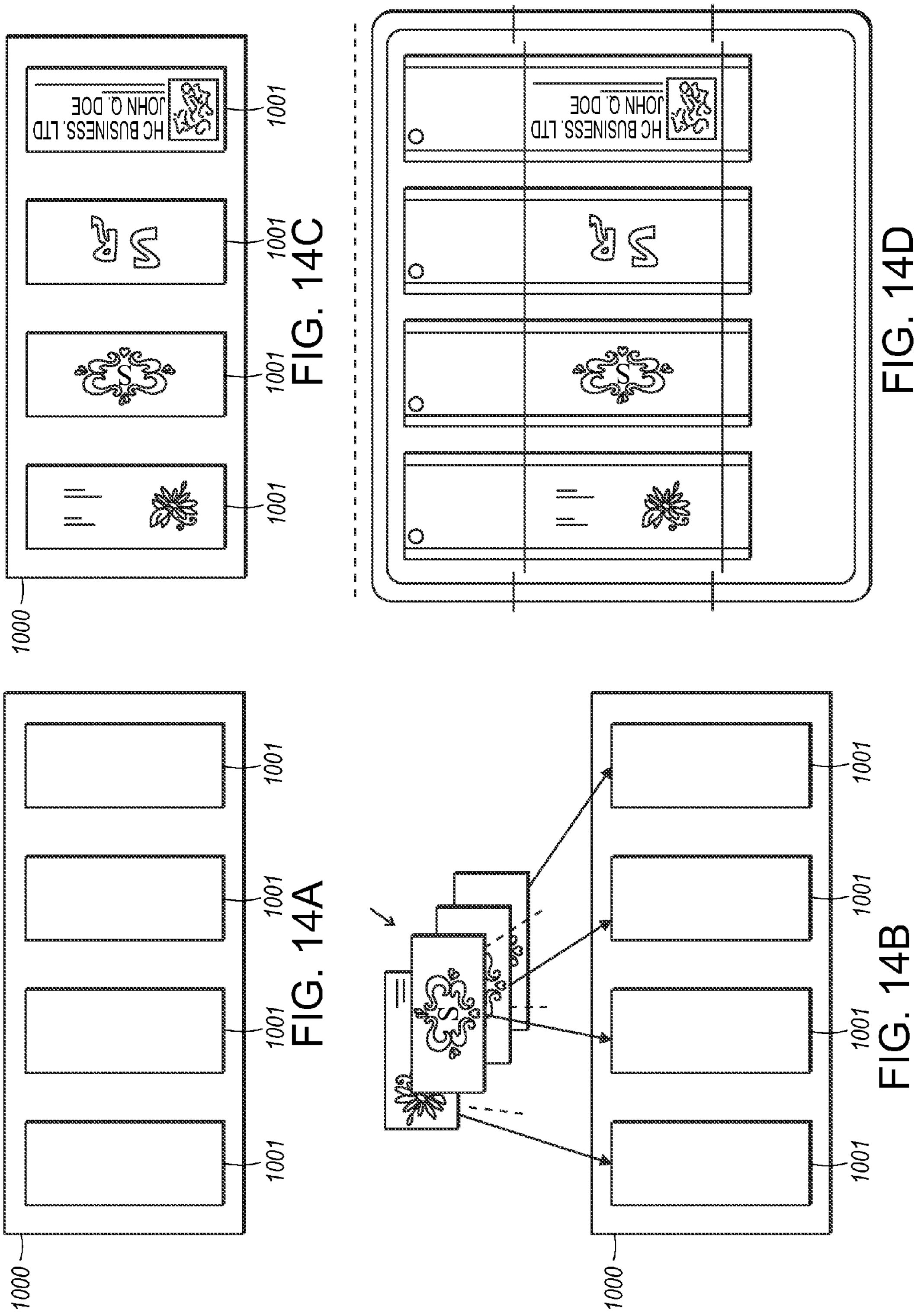
FIG. 14A is a schematic representation of an example gang template.
FIG. 14B is a schematic representation illustrating the filling of a gang template.
FIG. 14C is a schematic representation of a filled gang.
FIG. 14D is a top down view of a tray filled with printed articles after the filled gang file of FIG. 14C is printed on a filled tray.

FIG. 13 is a more detailed block diagram of an online retail production system 700 implementing multiple aspects of the invention. In particular, the system 700 facilitates and implements the simultaneous mass production of individual orders of various different articles of manufacture printed with various individually-customized printed content. As shown in FIG. 13, an online retailer offering various different types of articles of manufacture individually customizable by individual customers with personalized printed content provisions one or more customer order server(s) 720 with web pages 724 which together implement a website 723. Product content, such as templates 709, layouts, designs, font schemes, color schemes, images, graphics, available for various different types of articles of manufacture are provisioned into a content database 791 or other computer storage by human or computer designers.

Any number of customers operating client computers 710 may access the website 723 hosted by the customer order server(s) 720 to view products (articles of manufacture) and product templates and to select, design, and/or customize various design components of a selected product prior to ordering. For example, multiple templates may be available for customizing or personalizing print content for printing on a product (article of manufacture) such as a drink holder ("koozie") 99*a*, a tape measure 99*b*, a ruler 99*c*, a USB flash drive ("memory stick") 99*d*, a magnetic clip 99*e*, a keychain tag 99*f*, a letter opener 99*g*, a foam cube (e.g., stress toy) 99*h*, a calculator 99*i*, or any other type of article of manufacture of a size suitable for printing in the conveyance printing system.

The various product templates may be selectable by the customer using client computer 710 for further customization such as adding customer-personalized information such as name, business name, address, phone number, website URL, taglines, etc. Furthermore, the template may include one or more image containers allowing a customer to upload one or more images into a selected design template 209. The customer may edit a selected template and make design changes using a design tool 727, and furthermore may preview the design using a preview tool 728. Once a customer is satisfied with their selections/customizations, they can place an order 701 through an order and purchase tool 726 at the customer order server(s) 720. Orders 701 are stored in an order database 792 and/or sent directly to a fulfillment center.

A production server 730 at a fulfillment center may retrieve orders 701 from the order database 792, extract individual product documents 702 from the retrieved orders 792, convert the individual product documents 702 into a set of related individual print files 703, aggregate individual ordered products 701 into a set of gangs 704 containing individual product print files 703 associated with ordered articles of manufacture to be printed, and orders printing of a batch of articles of manufacture through the conveyance printing system 740 a "gang" at a time. Printed articles of manufacture exiting the printing process are sorted into their individual orders, packaged, and shipped or otherwise delivered to the respective individual customers.

System 700 is configured for mass production of customized printed products or items that may be of differing types, shapes, and construction. In this system, mass production includes the simultaneous printing of multiple articles of manufacture which can be ordered from multiple different customers. The content to be printed on the various ordered articles of manufacture can differ from order to order; thus, each article of manufacture to be printed can potentially be printed with unique content.

In the system shown in FIG. 13, a potentially enormous number (e.g., thousands or even hundreds of thousands or millions) of individual and commercial customers, wishing to place orders for one or more products of various different types, shapes, and construction materials, and which are to be printed with various graphical and customized designs printed or otherwise affixed thereon, access the system over a network 705. In the illustrative embodiment, customers operating respective client computers 210 may access the system over the Internet or other network 705 via web browsers (or similar interactive communication software) running on personal computers, mobile devices (e.g., smartphones, tablets, or pad computers), or other electronic devices 710.

In general, the orders 701 submitted by customers are short run manufacturing jobs, i.e., manufacturing jobs of products of a particular type and print design of less than 40,000 units, typically 1-5,000 units). Through the network 705, each customer can access the website 723 comprising a plurality of related web pages 724 configured to allow a customer to select and customize a graphical design or template 709 to be printed, etched, engraved, stamped, affixed, or otherwise embodied on a product (e.g., koozies 99*a*, tape measures 99*b*, rulers 99*c*, memory sticks 99*d*, magnetic clips 99*e*, keychain tags 99*f*, letter openers 99*g*, stress toys 99*h*, calculators 99*i*, etc.). A product may be available in multiple different types and construction materials from which the customer may select. Design tool(s) 727 software may execute directly on the customer order server(s) 720, or may be downloaded from the customer order server(s) 720 as part of web pages 724 displayed to the user to run in the user's browser on the customer's computer 710. In an embodiment, the design tool(s) 727 enable the customer to perform simple design functions by completing a selected template using a Design Wizard, or more complex design functions using a Design Studio, locally in the browser. In an embodiment, the templates are embodied using an XML format or other appropriate format.

Once the customer has completed customization of the product template design, the customer places an order through the website 723 in conjuction with operation of an order and purchase tool 726. At this point the customized product design template is referred to as an individual product document 701. An individual product document 701 is a document description of an ordered article of manufacture, and in one embodiment is stored in an XML format. Placement of an order results in a collection of information associated with the order. The collection of information is referred to herein as an order 701. The individual product document 701 is stored in an Orders database 792. In an embodiment, the individual product document 701 stored in XML format, and the XML file is then converted by rendering software 732 at a production server 730 into a set of associated PostScript files print-ready such as an Adobe® .pdf or other such PostScript file.

The production server 730 may include scheduling software 731. The scheduling software 731 operates to schedule the production of printed products based on parameters associated with the received orders 701, such as shipping time, type of product, etc.

Rendering software 732 converts individual product documents 702 from the web format (e.g., <XML> or Document Object Model (DOM) descriptions) used in the web browser for displaying the web view of the design as seen by the customer during the design process to an associated print-ready (i.e., manufacturable) file 703, such as a Postscript (e.g., .pdf) file ready to print by printing system of the conveyance printing system.

A Ganging system 733 fills predefined ganging templates containing placeholders for actual individual print-ready files 703 according to a schedule determined from the Scheduling module 731 in conjunction with the print job management function 731. As an example, FIG. 2C depicts an example tray inlay 210*c* for holding a plurality of articles of manufacture 99*c*. As illustrated, the articles of manufacture 99*c* are aligned along both the x- and y-axes.

Given a tray 200 that aligned in the same position in the printer system 170 every time the tray 200 passes through the printer, and having an inlay 210*c* configured with fixed positions for holding articles of manufacture in aligned position, a gang corresponding to the layout of the articles to be engraved can be constructed.

In an embodiment, and with reference to FIGS. 14A through 14D, individual article print files 703 from individual customer orders are arranged in a layout according to a predefined gang template 1000. In an embodiment, the gang template 1000 is saved as a postscript file 704 such as a .pdf file defining a plurality of pre-positioned empty cells 1001. A cell 1001 is a content container of predefined dimensions corresponding to a position and dimensions of a targeted print area of an article mounted on the tray 200 and positioned in the gang file layout in a unique predefined location in the gang template 1000. Each empty cell 1001 may be filled with a single PostScript individual article print file 703.

In the examples shown in FIGS. 14A-14D, the gang template 1000 includes four cells 1001 of identical size arranged in a single row with the target print area aligned down the center of the available printable area. Each cell 1001 corresponds to a target print area on an individual article of manufacture. The cell layout shown in FIGS. 14A-14D is representative only and will vary across different types of articles, different target print areas on the articles, different numbers of articles accommodated by different trays, etc.

Referring back to FIG. 13, the cells 1001 in a gang template 1000 are filled according to an automated ganging algorithm, executed within the ganging system 733. The ganging system 733 selects, from a gang template database 720, a gang template 1000 appropriate to a particular article of manufacture and instantiates a gang print file 704 for that particular article of manufacture. The ganging system 733 selects items scheduled for production and begins filling corresponding cells of the instantiated gang file 704 with the corresponding individual article print files 703 until the gang is filled. If the ordered quantity of printed articles associated with an individual customer order is greater than one, then additional instances of the individual article print file 703 may be placed in additional cells of the associated gang template 1000 to cause the ordered quantity of the item to be printed.

The filled gang file 704 is sent to the conveyance printing system 740, where a tray of the type associated with the particular gang file 704 is loaded with corresponding articles of manufacture. The loaded tray is conveyed to the printing system 150, where the gang file is printed as a single print job onto the articles of manufacture loaded on the tray 200. The tray with printed articles is then conveyed to an unloading station 140, wherein the printed articles are removed from the tray and sorted into individual orders by a human or a computerized sorting system. The sorted orders may then be packaged for shipping by a packaging system.

It will be appreciated that while one pattern may be printed on the multiple articles in a gang, alternatively and potentially each gang cell can contain a different individual print job and therefore individual print jobs corresponding to different customers and/or different print orders can be simultaneously printed onto multiple different articles within the same print job that is sent to the conveyance printing system 740. It will be further appreciated that while embodiments of the tray inlay shown herein depict tray inlays configured to hold multiple instances of a single type article of manufacture, alternative tray inlays may be configured to hold articles of manufacture of multiple different types. For example, a tray inlay could hold a one each of articles of manufacture types 99*a*, 99*b*, 99*c* and 99*d*. The corresponding gang file would then include a cell for containing an individual article print file 703 for each type of article of manufacture 99*a*, 99*b*, 99*c* and 99*d*.

As will be appreciated from the above detailed description, the conveyance printing system offers multiple advantages to the printing industry. Features include, but are not limited to:

- A continuous-flow printing system—no need to take the printer offline to change out printing pallets;
- Ability to print multiple different types of article of manufacture without taking the system offline to change the pallet configuration;
- Automated detection of article of manufacture to print;
- Automated detection of height of articles of manufacture and adjustment of height of tray to bring print nozzles within specified tolerance of print surface;

Universal tray frame with removable and switchable article of manufacture specific tray inlay designed for each specific type of article of manufacture—the height of each inlay is adjusted to place the print surface of the loaded article(s) of manufacture at a predetermined height which is standardized across different types of articles of manufacture;

Automated system indicating to operator which type of tray to load next;

ergonomic tray handling;

Ability to easily insert a high-priority print job into the print manufacturing flow without stopping the flow or taking the printing system offline.

Ability to selectively program which functions to turn on or off based on information associated with the tray/slot identifier(s)

Those of skill in the art will appreciate that many of the control functions utilized in the systems and methods described and illustrated herein may be implemented in software, firmware or hardware, or any suitable combination thereof. For example, many control features may be implemented in software for purposes of low cost and flexibility. Thus, those of skill in the art will appreciate that the method and apparatus of the invention may be implemented by one or more processing devices (such as, but not limited to a computer, microprocessor, programmable logic devices, etc.) by which instructions are executed, the instructions being stored for execution on a computer-readable medium and being executed by any suitable instruction processor. Alternative embodiments are contemplated, however, and are within the spirit and scope of the invention.

Although this preferred embodiment of the present invention has been disclosed for illustrative purposes, those skilled in the art will appreciate that various modifications, additions and substitutions are possible, without departing from the scope and spirit of the invention as disclosed in the accompanying claims.

What is claimed is:

1. A manufacturing tray system for processing in a manufacturing system of different types of articles of manufacture, comprising:

a tray base configured to interface with a conveyance system for transport through the manufacturing system;

inlays;

an interchangeable tray inlay supported by said tray base, and arranged to hold an article of manufacture;

a tray identifier associated with processing information corresponding to the tray and to the article of manufacture, the processing information being indicative of a process to be performed by the manufacturing system.

2. The tray system of claim 1, wherein the tray inlay is configured to hold a plurality of articles of manufacture, and the tray identifier is associated with the plurality of articles of manufacture.

3. The tray system of claim 1, wherein the tray inlay is configured to hold at least two different types of articles of manufacture.

4. The tray system of claim 1, comprising one or more position identifiers associated with respective positions of each article of manufacture loadable in the tray inlay.

5. The tray system of claim 1, wherein each position identifier is further associated with corresponding individual print content associated with a respective individual article of manufacture.

6. The tray system of claim 1, wherein the tray inlay is configured to hold each article of manufacture such that a target print area on the article of manufacture is held at a predetermined height relative to the tray base.

7. The tray system of claim 1, wherein the tray identifier comprises a Radio-Frequency Identifier (RFID) tag.

8. The tray system of claim 1, wherein the identifier comprises a barcode.

9. The tray system of claim 1, wherein the tray identifier is uniquely identifiable from one or more additional trays interfacable with the transport system.

* * * * *